(12) United States Patent
Gao et al.

(10) Patent No.: US 12,711,385 B2
(45) Date of Patent: Aug. 18, 2026

(54) NEURAL NETWORK SPARSIFICATION APPARATUS AND METHOD AND RELATED PRODUCT

(71) Applicant: Cambricon (Xi'an) Semiconductor Co., Ltd., Xi'an (CN)

(72) Inventors: Yufeng Gao, Xi'an (CN); Shibing Zhu, Xi'an (CN); Shaoli Liu, Xi'an (CN); Xishan Zhang, Xi'an (CN); Deyuan He, Xi'an (CN)

(73) Assignee: Cambricon (Xi'an) Semiconductor Co., Ltd.

( * ) Notice: Subject to any disclaimer, the term of this patent is extended or adjusted under 35 U.S.C. 154(b) by 877 days.

(21) Appl. No.: 18/003,821

(22) PCT Filed: Oct. 14, 2021

(86) PCT No.: PCT/CN2021/123879
§ 371 (c)(1),
(2) Date: Dec. 29, 2022

(87) PCT Pub. No.: WO2022/095675
PCT Pub. Date: May 12, 2022

(65) Prior Publication Data

US 2023/0259780 A1 Aug. 17, 2023

(30) Foreign Application Priority Data

Nov. 4, 2020 (CN) ......................... 202011216903.5
Dec. 25, 2020 (CN) ......................... 202011563259.9

(51) Int. Cl.
*G06N 3/08* (2023.01)
*G06N 3/082* (2023.01)
*G06N 3/084* (2023.01)

(52) U.S. Cl.
CPC ............. *G06N 3/084* (2013.01); *G06N 3/082* (2013.01)

(58) Field of Classification Search
CPC ..................................................... G06N 3/082
See application file for complete search history.

(56) References Cited

U.S. PATENT DOCUMENTS 5,052,043 A 9/1991 Gaborski
6,144,977 A 11/2000 Giangarra et al.
(Continued)

FOREIGN PATENT DOCUMENTS

CN 1503858 A 6/2004
CN 1503958 A 6/2004
CN 1851668 A 10/2006
CN 101572829 A 11/2009
CN 102270042 A 12/2011
CN 102404673 A 4/2012
(Continued)

OTHER PUBLICATIONS

Kalchbrenner, Nal, et al. "Efficient neural audio synthesis." International Conference on Machine Learning. PMLR, 2018. (Year: 2018).*
(Continued)

*Primary Examiner* — Hal Schnee
(74) *Attorney, Agent, or Firm* — Letao Qin

(57) ABSTRACT

The present disclosure relates to a method and apparatus for sparsification training of a neural network model, a board card, and a readable storage medium. The data processing apparatus of the present disclosure is implemented as a computing apparatus and included in a combined processing apparatus. The combined processing apparatus further includes an interface apparatus and other processing apparatus. The computing apparatus interacts with other processing apparatus to jointly complete a computing operation specified by a user. The combined processing apparatus further includes a storage apparatus. The storage apparatus is connected to the computing apparatus and other process-
(Continued)

| $d_{11}$ | $d_{21}$ | $d_{31}$ | $d_{41}$ |
|---|---|---|---|
| $d_{12}$ | $d_{22}$ | $d_{32}$ | $d_{42}$ |
| $d_{13}$ | $d_{23}$ | $d_{33}$ | $d_{43}$ |
| $d_{14}$ | $d_{24}$ | $d_{34}$ | $d_{44}$ |

803

| 0 | 0 | $a_{31}$ | $a_{41}$ |
|---|---|---|---|
| $a_{12}$ | 0 | 0 | $a_{42}$ |
| $a_{13}$ | $a_{23}$ | 0 | 0 |
| 0 | $a_{24}$ | $a_{34}$ | 0 |

ing apparatus, respectively. The storage apparatus is used to store data of the computing apparatus and other processing apparatus. Embodiments of the present disclosure provide a solution related to the sparsification training of the neural network model, which improves operation ability of the neural network model and improves processing efficiency of a machine.

20 Claims, 14 Drawing Sheets

(56) References Cited

U.S. PATENT DOCUMENTS 6,671,796 B1 12/2003 Sudharsanan et al.
6,715,065 B1 3/2004 Ebata et al.
6,931,639 B1 8/2005 Eickemeyer
7,236,995 B2 6/2007 Hinds
7,242,414 B1 7/2007 Thekkath et al.
7,406,451 B2 7/2008 Mrziglod et al.
7,721,128 B2 5/2010 Johns et al.
7,945,607 B2 5/2011 Hinds
8,051,117 B2 11/2011 Lundvall et al.
8,190,664 B2 5/2012 Lundvall et al.
8,560,591 B2 10/2013 Lundvall et al.
8,694,572 B2 4/2014 Samy et al.
8,762,438 B2 6/2014 Lundvall et al.
8,924,455 B1 12/2014 Barman et al.
9,412,366 B2 8/2016 Wilensky et al.
10,187,568 B1 1/2019 Tran et al.
10,224,954 B1 3/2019 Madduri et al.
10,360,304 B1 7/2019 Alvarez et al.
10,427,306 B1 10/2019 Quinlan et al.
10,656,942 B2 5/2020 Madduri et al.
10,929,744 B2 2/2021 Li et al.
2002/0138714 A1 9/2002 Leibholz et al.
2003/0167460 A1 9/2003 Desai et al.
2005/0138327 A1 6/2005 Tabei
2006/0161375 A1 7/2006 Duberstein et al.
2007/0220076 A1 9/2007 Hinds
2008/0148120 A1 6/2008 Seuring
2009/0113186 A1 4/2009 Kato et al.
2009/0125293 A1 5/2009 Lefurgy et al.
2010/0073068 A1 3/2010 Cho et al.
2011/0060587 A1 3/2011 Phillips et al.
2011/0301777 A1 12/2011 Cox et al.
2012/0316845 A1 12/2012 Grey et al.
2013/0054110 A1 2/2013 Sata
2013/0332610 A1 12/2013 Beveridge
2014/0081625 A1 3/2014 Wilensky et al.
2014/0164737 A1 6/2014 Collange et al.
2014/0249814 A1 9/2014 Nakano et al.
2015/0134581 A1 5/2015 Doeding et al.
2015/0370303 A1 12/2015 Krishnaswamy et al.
2016/0026231 A1 1/2016 Ignowski et al.
2016/0054922 A1 2/2016 Awasthi et al.
2016/0124710 A1 5/2016 Lutz et al.
2016/0170866 A1 6/2016 Ioualalen et al.
2016/0328645 A1 11/2016 Lin et al.
2017/0061279 A1 3/2017 Yang et al.
2017/0090956 A1 3/2017 Linsky
2017/0103022 A1 4/2017 Kreinin et al.
2017/0142327 A1 5/2017 Bayani
2017/0161604 A1 6/2017 Craddock et al.
2017/0221176 A1 8/2017 Munteanu et al.
2017/0257079 A1 9/2017 Jain et al.
2017/0262959 A1 9/2017 Lee et al.
2017/0316307 A1 11/2017 Koster et al.
2017/0316312 A1 11/2017 Goyal et al.
2017/0344882 A1 11/2017 Ambrose et al.
2017/0353163 A1 12/2017 Gazneli et al.
2017/0357530 A1 12/2017 Shih et al.
2017/0357910 A1 12/2017 Sommer et al.
2018/0046903 A1 2/2018 Yao et al.
2018/0088996 A1 3/2018 Rossi et al.
2018/0096243 A1 4/2018 Patil et al.
2018/0157464 A1 6/2018 Lutz et al.
2018/0288440 A1 10/2018 Chao
2018/0293517 A1 10/2018 Browne et al.
2018/0300931 A1 10/2018 Vembu et al.
2018/0322391 A1 11/2018 Wu et al.
2018/0357541 A1 12/2018 Chen et al.
2018/0367729 A1 12/2018 Parasnis et al.
2018/0373976 A1 12/2018 Woo
2019/0034784 A1 1/2019 Li et al.
2019/0042925 A1 2/2019 Choe et al.
2019/0050710 A1 2/2019 Wang et al.
2019/0057696 A1 2/2019 Ogawa
2019/0114142 A1 4/2019 Yoda et al.
2019/0122094 A1 4/2019 Chen et al.
2019/0122119 A1 4/2019 Husain
2019/0138372 A1 5/2019 Tee
2019/0164285 A1 5/2019 Nye et al.
2019/0180170 A1 6/2019 Huang et al.
2019/0199370 A1 6/2019 Madduri et al.
2019/0205737 A1 7/2019 Bleiweiss et al.
2019/0205746 A1 7/2019 Nurvitadhi et al.
2019/0220734 A1 7/2019 Ferdman et al.
2019/0228762 A1 7/2019 Wang et al.
2019/0251429 A1 8/2019 Du et al.
2019/0265949 A1 8/2019 Ito
2019/0278677 A1 9/2019 Terechko et al.
2019/0294968 A1 9/2019 Vantrease et al.
2019/0339937 A1 11/2019 Lo et al.
2020/0005424 A1 1/2020 Appu et al.
2020/0097799 A1 3/2020 Divakar et al.
2020/0117453 A1 4/2020 Zhang et al.
2020/0117614 A1 4/2020 Zhang et al.
2020/0125508 A1 4/2020 Liu et al.
2020/0126554 A1 4/2020 Chen et al.
2020/0126555 A1 4/2020 Chen et al.
2020/0142748 A1 5/2020 Liu et al.
2020/0159527 A1 5/2020 Zhang et al.
2020/0159530 A1 5/2020 Zhang et al.
2020/0159531 A1 5/2020 Zhang et al.
2020/0159532 A1 5/2020 Zhang et al.
2020/0159533 A1 5/2020 Zhang et al.
2020/0159534 A1 5/2020 Li et al.
2020/0160162 A1 5/2020 Zhang et al.
2020/0160163 A1 5/2020 Liu et al.
2020/0160219 A1 5/2020 Zhang et al.
2020/0160220 A1 5/2020 Zhang et al.
2020/0160221 A1 5/2020 Zhang et al.
2020/0160222 A1 5/2020 Zhang et al.
2020/0168227 A1 5/2020 Chen et al.
2020/0174547 A1 6/2020 Fang et al.
2020/0183752 A1 6/2020 Liu et al.
2020/0241874 A1 7/2020 Chen et al.
2020/0257972 A1 8/2020 Miniskar et al.
2020/0334041 A1 10/2020 Zhang et al.
2020/0334522 A1 10/2020 Zhang et al.
2020/0334572 A1 10/2020 Zhang et al.
2020/0394522 A1 12/2020 Liu et al.
2020/0394523 A1 12/2020 Liu et al.
2021/0042889 A1 2/2021 Pei
2021/0061028 A1 3/2021 Da Deppo et al.
2021/0117768 A1 4/2021 Liu et al.
2021/0117810 A1 4/2021 Liu
2021/0150362 A1* 5/2021 Zhang .................... G06N 3/063
2021/0182177 A1 6/2021 Su et al.
2021/0264270 A1 8/2021 Liu et al.
2021/0334007 A1 10/2021 Liu et al.
2021/0334137 A1 10/2021 Zhang et al.
2021/0341989 A1 11/2021 Chen et al.
2021/0374510 A1 12/2021 Liu et al.
2021/0374511 A1 12/2021 Liu et al.
2022/0230069 A1 7/2022 Gao et al.

FOREIGN PATENT DOCUMENTS

CN 102684701 A 9/2012
CN 102761509 A 10/2012
CN 102789413 A 11/2012
CN 102903089 A 1/2013

(56) References Cited

FOREIGN PATENT DOCUMENTS

| | | | |
|---|---|---|---|
| CN | 102981854 | A | 3/2013 |
| CN | 103152673 | A | 6/2013 |
| CN | 104914977 | A | 9/2015 |
| CN | 105389158 | A | 3/2016 |
| CN | 105426344 | A | 3/2016 |
| CN | 103534664 | A | 8/2016 |
| CN | 105893419 | A | 8/2016 |
| CN | 105978611 | A | 9/2016 |
| CN | 106156310 | A | 11/2016 |
| CN | 106354568 | A | 1/2017 |
| CN | 106406812 | A | 2/2017 |
| CN | 106469291 | A | 3/2017 |
| CN | 106485316 | A | 3/2017 |
| CN | 106502626 | A | 3/2017 |
| CN | 106570559 | A | 4/2017 |
| CN | 106650922 | A | 5/2017 |
| CN | 106814639 | A | 6/2017 |
| CN | 106951587 | A | 7/2017 |
| CN | 106951962 | A1 | 7/2017 |
| CN | 106997236 | A | 8/2017 |
| CN | 107003988 | A | 8/2017 |
| CN | 107025629 | A | 8/2017 |
| CN | 107316078 | A | 11/2017 |
| CN | 107330515 | A | 11/2017 |
| CN | 107368174 | A | 11/2017 |
| CN | 107451654 | A | 12/2017 |
| CN | 107451658 | A | 12/2017 |
| CN | 107608715 | A | 1/2018 |
| CN | 107644254 | A | 1/2018 |
| CN | 107688855 | A | 2/2018 |
| CN | 107797913 | A | 3/2018 |
| CN | 107886164 | A | 4/2018 |
| CN | 108053028 | A | 5/2018 |
| CN | 104899641 | A | 7/2018 |
| CN | 108337000 | A | 7/2018 |
| CN | 108510067 | A | 9/2018 |
| CN | 108717570 | A | 10/2018 |
| CN | 109062540 | A | 12/2018 |
| CN | 109063820 | A | 12/2018 |
| CN | 109213962 | A | 1/2019 |
| CN | 109902745 | A | 6/2019 |
| CN | 109934331 | A | 6/2019 |
| CN | 109993296 | A | 7/2019 |
| CN | 110059733 | A | 7/2019 |
| CN | 110163350 | A | 8/2019 |
| CN | 11055450 | A | 12/2019 |
| CN | 110780845 | A | 2/2020 |
| CN | 111652366 | A | 9/2020 |
| EP | 0 789 296 | A1 | 8/1997 |
| EP | 2 703 945 | A2 | 3/2014 |
| EP | 3 106 997 | A2 | 12/2016 |
| EP | 3 407 268 | A1 | 11/2018 |
| JP | H03-075860 | A | 8/1989 |
| JP | H09-265379 | A | 10/1997 |
| JP | 2009-134433 | A | 8/2012 |
| JP | 2013-514570 | A | 4/2013 |
| JP | 2014-199464 | A | 10/2014 |
| JP | 2015-176158 | A | 10/2015 |
| JP | 201826114 | A | 2/2018 |
| JP | 2019-519852 | A | 7/2019 |
| WO | 2008153194 | A1 | 12/2008 |
| WO | 2014199464 | A1 | 12/2014 |
| WO | 2016186823 | A1 | 11/2016 |
| WO | 2017138220 | A1 | 8/2017 |
| WO | 2017185412 | A1 | 11/2017 |
| WO | 2020097217 | A1 | 5/2020 |

OTHER PUBLICATIONS

Liu, Junjie, et al. "Dynamic sparse training: Find efficient sparse network from scratch with trainable masked layers." arXiv preprint arXiv:2005.06870 (2020). (Year: 2020).*

Lemaire et al., "Structured Pruning of Neural Networks with Budget-Aware Regularization", ArXiv: 1811.09332v3 [cs.NE] Dec. 19, 2019 (Year: 2019).

Ng, A, "CS294A Course Notes—Sparse Autoencoder," downloaded from <https://web.stanford.edu/class/cs294a/sparseAutoencoder_2011 new.pdf> and verified online at least as of Feb. 19, 2015 via <https://web.archive.org/web/20150219073254/https://web.stanford.edu/class/cs>, 19 pp. (Year: 2011).

Lin et al., "Towards Optimal Structured CNN Pruning via Generative Adversarial Learning" arXiv:1903.09291v1 [cs.CV] Mar. 22, 2019 (Year: 2019).

Wang et al., "Structured Pruning for Efficient Convolutional Neural Networks via Incremental Regularization" IEEE Journal of Selected Topics in Signal Processing, vol. 14, No. 4, May 2020 (Year: 2020).

Non-Final Office Action for U.S. Appl. No. 17/557,802, mailed Jul. 14, 2025, 45 pages.

Final Office Action for U.S. Appl. No. 17/557,802, mailed Sep. 18, 2025, 45 pages.

Vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI: 10.1109/JPROC.2017.2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA.2016.42 ISBN: 978-0-7695-3174-8 [retrieved on Aug. 24, 2016].

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc. 2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), XP055673941, Retrieved from the Internet: URL:https://tigerprints.clemson.edu/cgi/viewcontent.cgi? article=1634&context=all theses retrieved on Mar. 5, 2020].

European Patent Office, Extended European Search Report for European Application No. 19212749.6 dated Mar. 18, 2020.

European Patent Office, Extended European Search Report for European Application No. 19212750.4 dated Mar. 18, 2020.

European Patent Office, Extended European Search Report for European Application No. 19212751.2 dated Mar. 18, 2020.

European Patent Office, Extended European Search Report for European Application No. 19212752.0 dated Mar. 18, 2020.

European Patent Office, Extended European Search Report for European Application No. 19214004.4 dated Mar. 18, 2020.

European Patent Office, Extended European Search Report for European Application No. 19213389.0 dated Mar. 18, 2020.

European Patent Office, Extended European Search Report for European Application No. 19212753.8 dated Mar. 18, 2020.

European Patent Office, Extended European Search Report for European Application No. 19212754.6 dated Mar. 18, 2020.

European Patent Office, Extended European Search Report for European Application No. 19212755.3 dated Mar. 18, 2020.

European Patent Office, Extended European Search Report for European Application No. 19212756.1 dated Mar. 18, 2020.

European Patent Office, Extended European Search Report for European Application No. 18906652.6 dated Mar. 18, 2020.

European Patent Office, Extended European Search Report for European Application No. 19212746.2 dated Mar. 18, 2020.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Li et al., "Using Artificial Neural Network for Predicting Thread Partitioning in Speculative Multithreading", IEEE, 2015, pp. 823-826.

(56) References Cited

OTHER PUBLICATIONS

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.
Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.
Anonymous, "Control unit—Wikipedia", May 8, 2017 (May 8, 2017), XP055673879, Retrieved from the Internet: URL: https://web.archive.org/web/20170508110348/https://en.wikipedia.org/ wiki/Control unit [retrieved on Mar. 5, 2020].
Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/2017/031Tutorial-on-JNN-4-of-5-DNN-Accelerator-Architectures.pdf [retrieved on Mar. 2, 2020].
Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].
Pedro O. Domingos, et al., "An Efficient and Scalable Architecture for Neural Networks With Backpropagation Learning" Proceedings/ 2005 International Conference on Field Programmable Logic and Applications {FPL): Tampere Hall, Tampere, Finland, Jan. 1, 2005, pp. 89-94, XP055606447, Piscataway, NJ. DOI: 10.1109/FPL.2005.1515704 ISBN: 978-0-7803-9362-2.
Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].
Song Mingcong et al., "In-Situ AI: Towards Autonomous and Incremental Deep Leaming for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].
Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].
Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].
European Patent Office, extended European search report for Application No. 19216754.2 mailed May 8, 2020.
Extended European Search Report for EP Application No. 19214324.6 mailed Oct. 1, 2020.
International Searching Authority, International Search Report for PCT Application No. PCT/CN2019/093144 mailed Oct. 9, 2019.
Extended European Search Report for Application No. 19215861.6 mailed May 15, 2020.
Extended European Search Report for Application No. 19215862.4 mailed May 15, 2020.
Sumina Yamashita, et al., "A Method to create illustrate images using DCGAN," JISJ SIG Technical Report, vol. 2017-MPS-112 No. 16, Feb. 27, 2017; translation of abstract included.
A Framework for Algorithm Deployment on Cloud-based Quantum Computers; arxiv.org, Cornell University Library, 201 Olin Library Cornell University Ithaca, NY 14853, Dated Oct. 24, 2018; pp. 1-10.

* cited by examiner

| | | | |
|---|---|---|---|
| $d_{11}$ | $d_{21}$ | $d_{31}$ | $d_{41}$ |
| $d_{12}$ | $d_{22}$ | $d_{32}$ | $d_{42}$ |
| $d_{13}$ | $d_{23}$ | $d_{33}$ | $d_{43}$ |
| $d_{14}$ | $d_{24}$ | $d_{34}$ | $d_{44}$ |

| | | | |
|---|---|---|---|
| 0 | 0 | $a_{31}$ | $a_{41}$ |
| $a_{12}$ | 0 | 0 | $a_{42}$ |
| $a_{13}$ | $a_{23}$ | 0 | 0 |
| 0 | $a_{24}$ | $a_{34}$ | 0 |

NEURAL NETWORK SPARSIFICATION APPARATUS AND METHOD AND RELATED PRODUCT

CROSS REFERENCE OF RELATED APPLICATIONS

The present application claims priority to: Chinese Patent Application No. 2020112169035 with the title of "Neural Network Sparsification Device and Method and Related Product" filed on Nov. 4, 2020; and Chinese Patent Application No. 2020115632599 with the title of "Neural Network Sparsification Apparatus and Method and Related Product" filed on Dec. 25, 2020. The contents of the aforementioned applications are incorporated herein by reference in their entireties.

TECHNICAL FIELD

The present disclosure generally relates to a processor field. More specifically, the present disclosure relates to a method and apparatus for sparsification training of a neural network model by a data processing apparatus, a chip, a board card, and a readable storage medium.

BACKGROUND

In recent years, with the rapid development of deep learning, algorithm performance in fields such as computer vision and natural language processing has made great strides. However, deep learning algorithm is a computing-intensive and storage-intensive tool. As information processing tasks are increasingly complicated, the requirements for real-time performance and accuracy of algorithms are increasing, and neural networks are often designed deeper and deeper. As such, the requirements of the neural networks for computing amount and storage space are increasing. As a result, existing artificial intelligence technologies based on deep learning are difficult to be directly applied to mobile phones, satellites, or embedded devices with limited hardware resources.

Therefore, compression, acceleration and optimization of a deep neural network model become very important. A large number of studies have tried to reduce the computing and storage requirements of the neural networks without affecting the precision of the model, which is of great significance for the engineering application of deep learning technology in embedded and mobile terminals. Sparsification is one of methods for model lightweight.

Network parameter sparsification is to reduce redundant components in a large network by an appropriate method, so as to decrease the requirements of the network for computing amount and storage space. Although an existing fine-grained parameter sparsification method model performs well, the method model is not friendly to hardware memory access. In other words, there are many on-chip and off-chip input/output overheads, and performance is low. In another aspect, although a structured sparsity method based on a channel and a convolution kernel improves hardware performance, precision loss of the model is large. Finally, most of existing sparsity algorithms use off-line fine-tuning. In other words, a to-be-trained model is sparsified and then fine-tuned. There are many limitations on the off-line fine-tuning, and the off-line fine-tuning may not achieve more significant performance benefits in model training.

Therefore, it is required for a solution for sparsification training of a neural network model.

SUMMARY

In order to at least partly solve one or more technical problems mentioned in BACKGROUND, a solution of the present disclosure provides an apparatus and method for sparsification training of a neural network model, a board card, and a readable storage medium.

A first aspect of the present disclosure discloses a method for sparsification training of a neural network model by a data processing apparatus. The method includes: performing sparsification processing at least on a neural network parameter based on a mask tensor to compute a value of a loss function in forward propagation; computing a neuron gradient and a neural network parameter gradient based on the loss function in back propagation; and updating the neural network parameter based on the neural network parameter gradient.

A second aspect of the present disclosure provides a computer readable storage medium, on which computer program codes for sparsification training of a neural network model are stored. When the computer program codes are run by a processing apparatus, the method of any embodiment of the first aspect is performed.

A third aspect of the present disclosure provides a data processing apparatus, which includes a control circuit, a storage circuit, and an operation circuit. The control circuit is configured to control the storage circuit and the operation circuit to perform sparsification training on a neural network model. The storage circuit is configured to store information, where the information at least includes a neural network parameter and a mask tensor. The operation circuit is configured to perform following operations under the control of the control circuit: performing sparsification processing at least on the neural network parameter based on the mask tensor to compute a value of a loss function in forward propagation; computing a neuron gradient and a neural network parameter gradient based on the loss function in back propagation; and updating the neural network parameter based on the neural network parameter gradient.

A fourth aspect of the present disclosure provides a chip, including the data processing apparatus of any embodiment of the third aspect.

A fifth aspect of the present disclosure provides a board card, including the chip of any embodiment of the fourth aspect.

Through the data processing apparatus, the method for sparsification training of the neural network model by using the data processing apparatus, and related products, embodiments of the present disclosure provide a sparsification solution during neural network training. This sparsification solution may support sparsification during forward propagation of the training, such as sparsification of an input channel dimension, or simultaneous sparsification of the input channel dimension and an output channel dimension. In some embodiments, when the simultaneous sparsification of the input channel dimension and the output channel dimension is performed in the forward propagation, the simultaneous sparsification of the input channel dimension and the output channel dimension may also be supported in the back propagation to further optimize performance. The sparsification solution of the present disclosure may be performed in multiple phases of the training. Moreover, different structured sparsity data flow structures may be used for related operations in different training phases to obtain optimized operation and IO (input and output) performance.

BRIEF DESCRIPTION OF DRAWINGS

By reading the following detailed description with reference to drawings, the above and other objects, features and technical effects of exemplary implementations of the present disclosure will become easier to understand. In the drawings, several implementations of the present disclosure are shown in an exemplary but not restrictive manner, and the same or corresponding reference numerals indicate the same or corresponding parts.

DETAILED DESCRIPTION

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" appear in the claims, specification, and drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more of other features, entities, steps, operations, elements, components, and/or collections thereof.

It should also be understood that the terms used in the specification of the present disclosure are merely intended to describe a specific embodiment rather than to limit the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

Specific implementations of the present disclosure will be described in detail in combination with drawings below.

Figure 1:
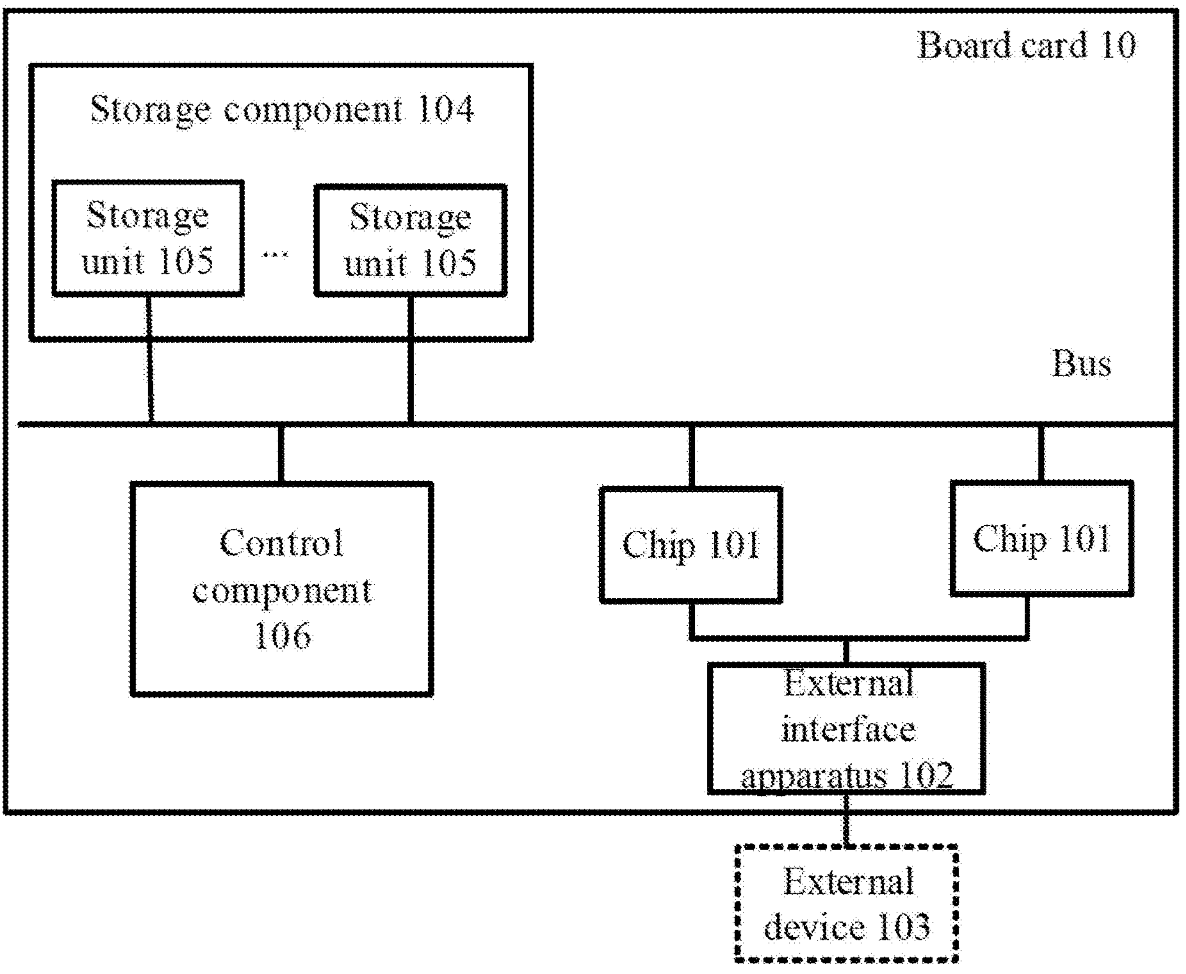
FIG. 1 shows a structural diagram of a board card according to an embodiment of the present disclosure.

FIG. 1 is a schematic structural diagram of a board card 10 according to an embodiment of the present disclosure. As shown in FIG. 1, the board card 10 includes a chip 101, which is a system on chip (SoC), or called an on-chip system, and integrates one or a plurality of combined processing apparatuses. The combined processing apparatus is an artificial intelligence operation unit, which is used to support various deep learning algorithms and various machine learning algorithms and meet the requirements for intelligent processing in complex scenarios in computer vision, speech, natural language processing, data mining, and other fields. In particular, deep learning technology is widely used in the field of cloud intelligence. A notable feature of cloud intelligence applications is the large amount of input data, which has high requirements for storage capacity and computing power of a platform. The board card 10 of this embodiment is suitable for cloud intelligent applications and has huge off-chip storage, huge on-chip storage, and powerful computing power.

The chip 101 is connected to an external device 103 through an external interface apparatus 102. The external device 103 may be, for example, a server, a computer, a camera, a monitor, a mouse, a keyboard, a network card, or a WIFI interface. To-be-processed data may be transferred from the external device 103 to the chip 101 through the external interface apparatus 102. A computing result of the chip 101 is still sent back to the external device 103 through the external interface apparatus 102. According to different application scenarios, the external interface apparatus 102 may include different interface forms, such as a peripheral component interconnect express (PCIe) interface.

The board card 10 further includes a storage component 104 used for storing data. The storage component 104 includes one or a plurality of storage units 105. The storage component 104 is connected to and transfers data to a control component 106 and the chip 101 through a bus. The control component 106 in the board card 10 is configured to regulate and control a state of the chip 101. As such, in an application scenario, the control component 106 may include a micro controller unit (MCU).

Figure 2:
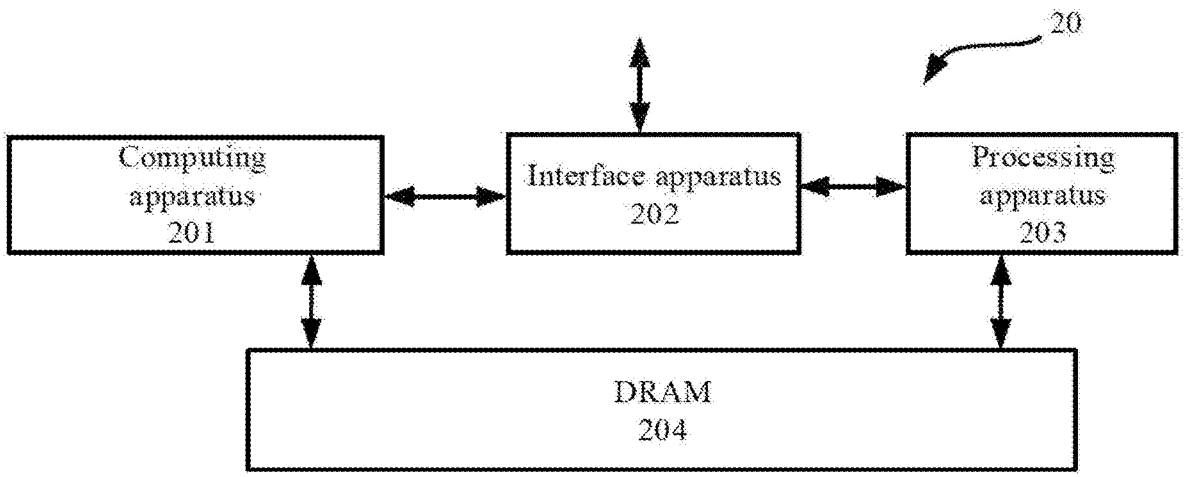
FIG. 2 shows a structural diagram of an integrated circuit apparatus according to an embodiment of the present disclosure.

FIG. 2 shows a structural diagram of a combined processing apparatus in the chip 101 of this embodiment. As shown in FIG. 2, the combined processing apparatus 20 includes a computing apparatus 201, an interface apparatus 202, a processing apparatus 203, and a dynamic random access memory (DRAM) 204.

The computing apparatus 201 is configured to perform an operation specified by a user. The computing apparatus 201 is mainly implemented as a single-core intelligent processor or a multi-core intelligent processor and is used for performing deep learning computing or machine learning computing. The computing apparatus 201 interacts with the processing apparatus 203 through the interface apparatus 202 to jointly complete the operation specified by the user.

The interface apparatus 202 is used to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire the control instructions from the processing apparatus 203 via the interface apparatus 202 and write the control instructions to an on-chip control cache of the computing apparatus 201. Alternatively or optionally, the interface apparatus 202 may further read data in the storage apparatus of the computing apparatus 201 and then transfer the data to the processing apparatus 203.

The processing apparatus 203 serves as a general processing apparatus and performs basic controls that include but are not limited to moving data, starting and/or stopping the computing apparatus 201. According to different implementations, the processing apparatus 203 may be a central processing unit (CPU), a graphics processing unit (GPU), or one or more of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, the number of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when the computing apparatus 201 and the processing apparatus 203 are considered together, both the computing apparatus 201 and the processing apparatus 203 may be viewed as forming a heterogeneous multi-core structure.

The DRAM 204 is used for storing to-be-processed data. The DRAM 204 is a double data rate (DDR) memory with a size of 16G or more than 16G generally. The DRAM 204 is used for saving data of the computing apparatus 201 and/or the processing apparatus 203.

Figure 3:
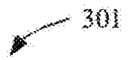
FIG. 3 shows a schematic diagram of an internal structure of a single-core computing apparatus according to an embodiment of the present disclosure.
Figure 3:
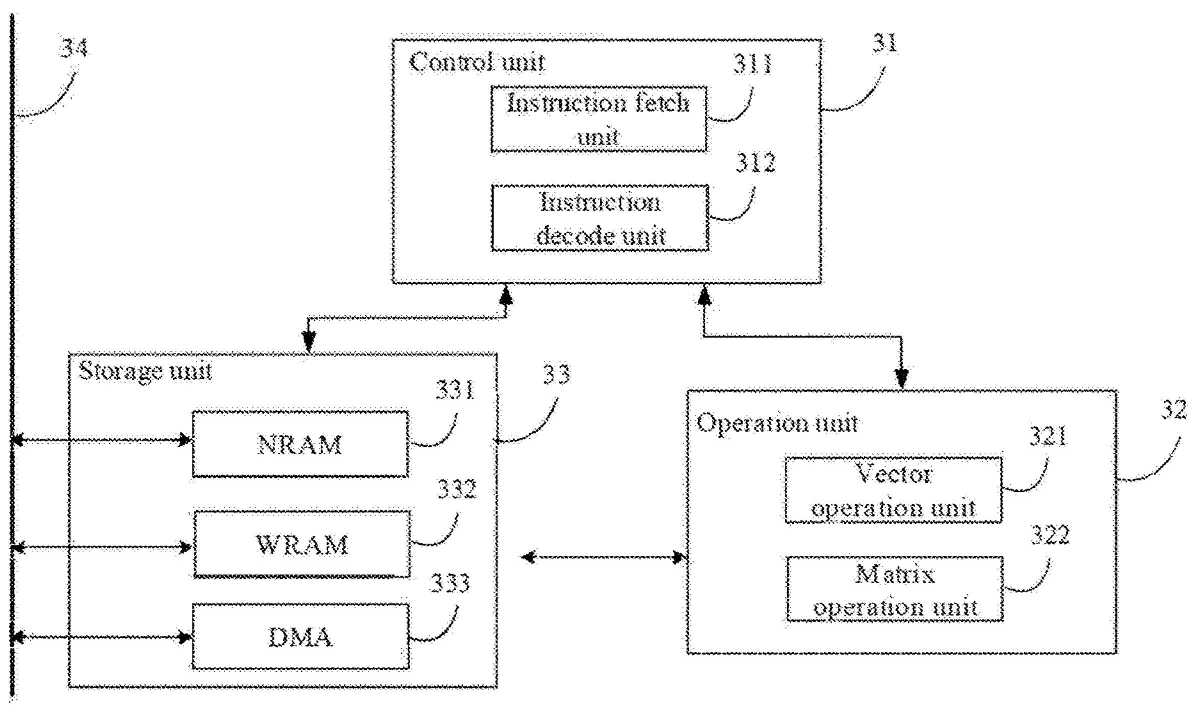

FIG. 3 is a schematic diagram of an internal structure of a computing apparatus 201 with a single core. A single-core computing apparatus 301 is configured to process input data in computer vision, speech, natural language, and data mining. The single-core computing apparatus 301 includes three units: a control unit 31, an operation unit 32, and a storage unit 33.

The control unit 31 is used for coordinating and controlling work of the operation unit 32 and the storage unit 33 to complete a deep learning task. The control unit 31 includes an instruction fetch unit (IFU) 311 and an instruction decode unit (IDU) 312. The instruction fetch unit 311 is used for acquiring an instruction from the processing apparatus 203. The instruction decode unit 312 is used for decoding the instruction acquired and sending a decoding result as control information to the operation unit 32 and the storage unit 33.

The operation unit 32 includes a vector operation unit 321 and a matrix operation unit 322. The vector operation unit 321 is used for performing a vector operation and supports complex operations such as vector multiplication, addition, and nonlinear conversion. The matrix operation unit 322 is responsible for core computing of deep learning algorithms, which includes matrix multiplication and convolution.

The storage unit 33 is used for storing or moving related data. The storage unit 33 includes a neuron storage unit (neuron RAM, NRAM) 331, a parameter storage unit (weight RAM, WRAM) 332, and a direct memory access unit (direct memory access, DMA) 333. The NRAM 331 is used for storing input neuron, output neuron, and an intermediate result after computing. The WRAM 332 is used for storing a convolution kernel of a deep learning network, which is a weight. The DMA 333 is connected to the DRAM 204 through a bus 34 and is responsible for data moving between the single-core computing apparatus 301 and the DRAM 204.

Figure 4:
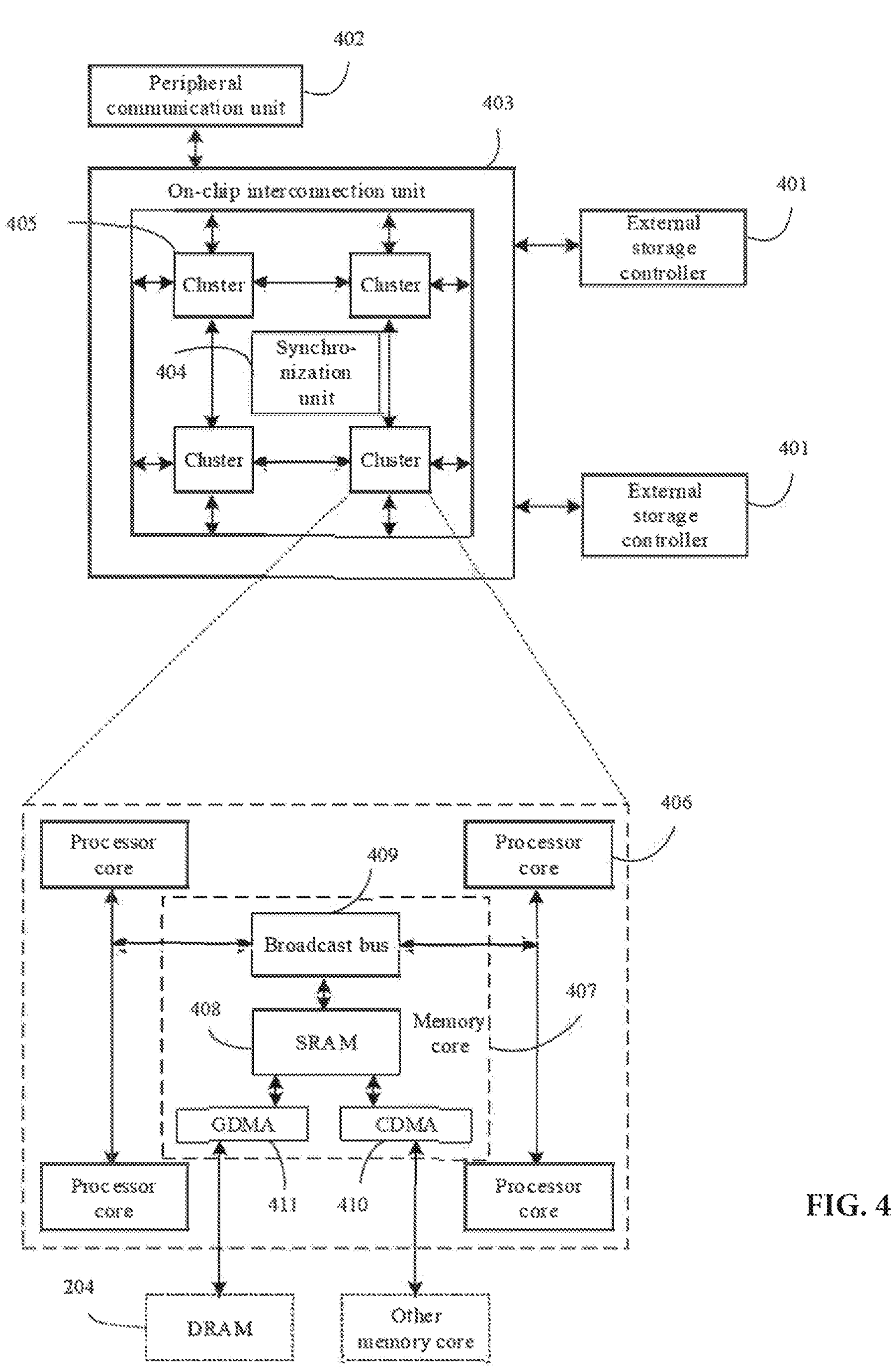
FIG. 4 shows a schematic diagram of an internal structure of a multi-core computing apparatus according to an embodiment of the present disclosure.

FIG. 4 is a schematic diagram of an internal structure of a computing apparatus 201 with multiple cores. A multi-core computing apparatus 41 adopts hierarchical structure design. The multi-core computing apparatus 41 serves as an on-chip system and includes at least one cluster. Each cluster further includes a plurality of processor cores. In other words, the multi-core computing apparatus 41 is composed by a hierarchy of on-chip system-cluster-processor core.

In terms of a hierarchy of on-chip system, as shown in FIG. 4, the multi-core computing apparatus 41 includes an external storage controller 401, a peripheral communication unit 402, an on-chip interconnection unit 403, a synchronization unit 404, and a plurality of clusters 405.

There may be a plurality of external storage controllers 401, two of which are exemplified in the figure. The external storage controller is used to, in response to access requests from the processor cores, access an external storage device, such as the DRAM 204 in FIG. 2, to read or write data off-chip. The peripheral communication unit 402 is used to receive a control signal from the processing apparatus 203 through the interface apparatus 202 and start the computing apparatus 201 to perform a task. The on-chip interconnection unit 403 connects the external storage controllers 401, the peripheral communication unit 402, and the plurality of clusters 405 and is used for transferring data and control signals between units. The synchronization unit 404 is a global barrier controller (GBC) and is used for coordinating the work progress of each cluster to ensure synchronization of information. The plurality of clusters 405 are computing cores of the multi-core computing apparatus 41, four of which are exemplified in the figure. With the development of hardware, the multi-core computing apparatus 41 of the present disclosure may further include 8, 16, 64, or even more clusters 405. The clusters 405 are used for efficiently performing deep learning algorithms.

In terms of a hierarchy of cluster, as shown in FIG. 4, each cluster 405 includes a plurality of processor cores (IPU cores) 406 and a memory core (MEM core) 407.

Figure 5:
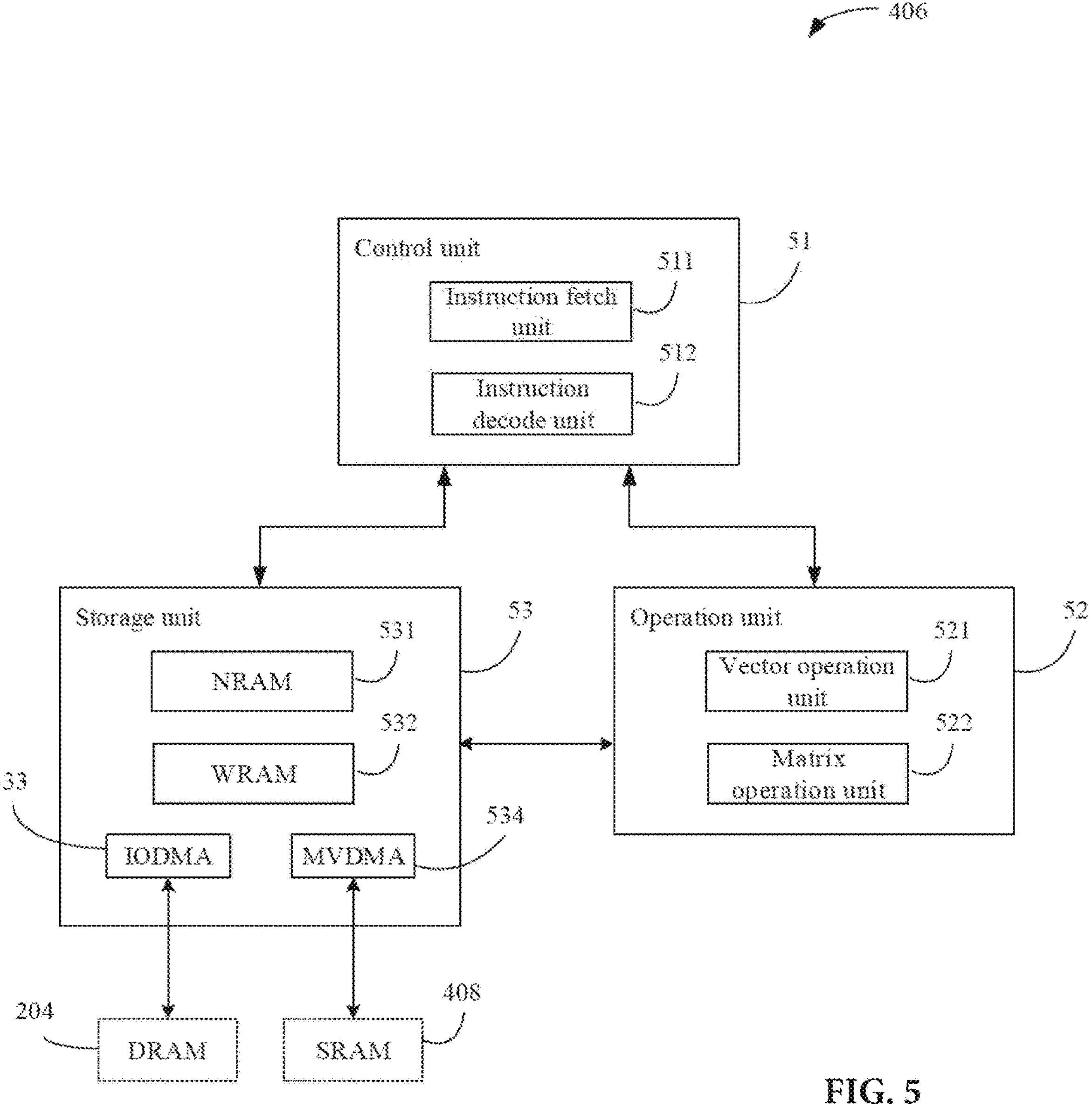
FIG. 5 shows a schematic diagram of an internal structure of a processor core according to an embodiment of the present disclosure.

Four processor cores 406 are exemplified in the figure. The present disclosure does not limit the number of the processor cores 406. An internal architecture of a processor core is shown in FIG. 5. Each processor core 406 is similar to the single-core computing apparatus 301 in FIG. 3. The processor core similarly includes three units: a control unit 51, an operation unit 52, and a storage unit 53. Functions and structures of the control unit 51, the operation unit 52, and the storage unit 53 are roughly the same as those of the control unit 31, the operation unit 32, and the storage unit 33, which will not be repeated herein. It is required to be especially noted that the storage unit 53 includes an input/output direct memory access unit (input/output direct memory access, IODMA) 533 and a move direct memory access unit (move direct memory access, MVDMA) 534. The IODMA 533 is used to control memory access of an NRAM 531/a WRAM 532 and the DRAM 204 through a broadcast bus 409. The MVDMA 534 is used to control memory access of the NRAM 531/the WRAM 532 and a storage unit (SRAM) 408.

Going back to FIG. 4, the memory core 407 is mainly used for storage and communication. In other words, the memory core 407 is mainly used for storing shared data or intermediate results between the processor cores 406 and performing communication between the clusters 405 and the DRAM 204, communication between the clusters 405, and communication between the processor cores 406. In other embodiments, the memory core 407 is capable of performing a scalar operation. The memory core 407 is used for performing the scalar operation.

The memory core 407 includes the SRAM 408, the broadcast bus 409, a cluster direct memory access unit (cluster direct memory access, CDMA) 410, and a global direct memory access unit (global direct memory access, GDMA) 411. The SRAM 408 plays the role of a high-performance data transfer station. Data reused among different processor cores 406 in a same cluster 405 is not required to be acquired from the DRAM 204 by the processor cores 406 separately. Instead, the data is transferred among the processor cores 406 by the SRAM 408. The memory core 407 is only required to quickly distribute the reused data from the SRAM 408 to the plurality of processor cores 406 to improve inter-core communication efficiency and greatly reduce on-chip and off-chip input/output access.

The broadcast bus 409, the CDMA 410, and the GDMA 411 are used for performing communication between the processor cores 406, communication between the clusters 405, and data transfer between the clusters 405 and the DRAM 204, respectively. The above will be explained separately below.

The broadcast bus 409 is used for completing high-speed communication between the processor cores 406 in the clusters 405. The broadcast bus 409 of this embodiment supports inter-core communication modes including unicast, multicast, and broadcast. The unicast refers to point-to-point (such as single processor core-to-single processor core) data transfer. The multicast refers to a communication mode in which a copy of data is transferred from the SRAM 408 to certain processor cores 406. The broadcast refers to a communication mode in which a copy of data is transferred from the SRAM 408 to all processor cores 406. The broadcast is a special case of the multicast.

The CDMA 410 is used for controlling memory access of the SRAM 408 between different clusters 405 in the same computing apparatus 201.

The GDMA 411 works with the external storage controller 401 and is used for controlling memory access from the SRAM 408 to the DRAM 204 in the clusters 405 or reading data from the DRAM 204 to the SRAM 408. It may be known from the above that communication between the DRAM 204 and the NRAM 431 or the WRAM 432 may be implemented through two channels. A first channel is to directly connect the DRAM 204 with the NRAM 431 or the WRAM 432 through the IODAM 433. A second channel is to transfer the data between the DRAM 204 and the SRAM 408 through the GDMA 411 first, and then to transfer the data between the SRAM 408 and the NRAM 431 or the WRAM 432 through the MVDMA 534. Although it seems that the second channel requires more components and has longer data flows, in fact, in some embodiments, the bandwidth of the second channel is much greater than that of the first channel. Therefore, the communication between the DRAM 204 and the NRAM 431 or the WRAM 432 through the second channel may be more efficient. The embodiment of the present disclosure may select a data transfer channel according to hardware conditions.

In other embodiments, a function of the GDMA 411 and a function of the IODMA 533 may be integrated in a same component. For the sake of description, the GDMA 411 and the IODMA 533 are viewed as different components in the present disclosure. For those skilled in the art, as long as functions and technical effects realized by components are similar to those of the present disclosure, the components shall fall within the scope of protection of the present disclosure. Further, the function of the GDMA 411, the function of the IODMA 533, a function of the CDMA 410, and a function of the MVDMA 534 may also be implemented by a same component.

Neural network training is to input training samples to adjust parameters of each layer, so that a result computed by the neural network is as close as possible to a real result. The neural network training includes forward propagation and back propagation. The forward propagation is to, based on the existing model, input the training samples and gradually extract input feature maps into abstract features through computing of each layer of the neural network. After the forward propagation, an output value called a predicted value is obtained. However, the back propagation is to, according to a loss function obtained by using the computing of the predicted value that is obtained after the forward propagation and a real value, adopt a gradient descent method and compute a partial derivative of the loss function to each parameter through a chain rule to update the parameter. In the chain rule, derivatives of error values corresponding to weights of a last layer of the neural network are computed first. These derivatives are called gradients. Then, these gradients are used to compute gradients of a penultimate layer of the neural network. This process is repeated until a gradient corresponding to each weight in the neural network is obtained. Finally, a corresponding gradient is subtracted from each weight in the neural network to update the weight once, so as to achieve the purpose of reducing the error value. Then, the parameter updated is used for training. This process is repeated many times, so that a computing result of the forward propagation meets expectation finally.

During the neural network training, every time the neural network goes through one forward propagation of signals and one corresponding back propagation of errors, the weight in the neural network is updated once by using the gradient. At this time, this process is called an iteration. In order to obtain a neural network with expected precision, a very large sample data set is required during the training. In this situation, it is impossible to input the whole sample data set into a computer at a time. Therefore, in order to solve this problem, it is required to divide the sample data set into a plurality of blocks, and each block of the sample data set is transmitted to the computer. After forward processing of each block of the sample data set, correspondingly, the weight of the neural network is updated once. When a complete sample data set passes through one forward processing of the neural network and one weight update is returned correspondingly, this process is called an epoch. In practice, it is not enough to transmit the complete data set in the neural network once, and it is required to transmit the complete data set in the same neural network many times. In other words, a plurality of epochs are required. Finally, the neural network with the expected precision is obtained.

This embodiment provides a solution for sparsification training of the neural network model based on the aforementioned hardware environment. More specifically, in each iteration that includes the forward propagation and the back propagation, sparsification processing is performed on neural network parameters at least in the forward propagation. The sparsification processing may be either one-dimensional sparsification (such as an input channel dimension) or multi-dimensional sparsification, such as two-dimensional sparsification (such as simultaneous sparsification of the input channel dimension and an output channel dimension). In some embodiments, when the simultaneous sparsification of the input channel dimension and the output channel dimension is performed in the forward propagation, the simultaneous sparsification of the input channel dimension and the output channel dimension may also be supported in the back propagation to further optimize performance. The sparsification solution of the present disclosure may be performed in multiple phases of the training. Moreover, different structured sparsity data flow structures may be used for related operations in different training phases to obtain optimized operation and IO performance.

Figure 6:
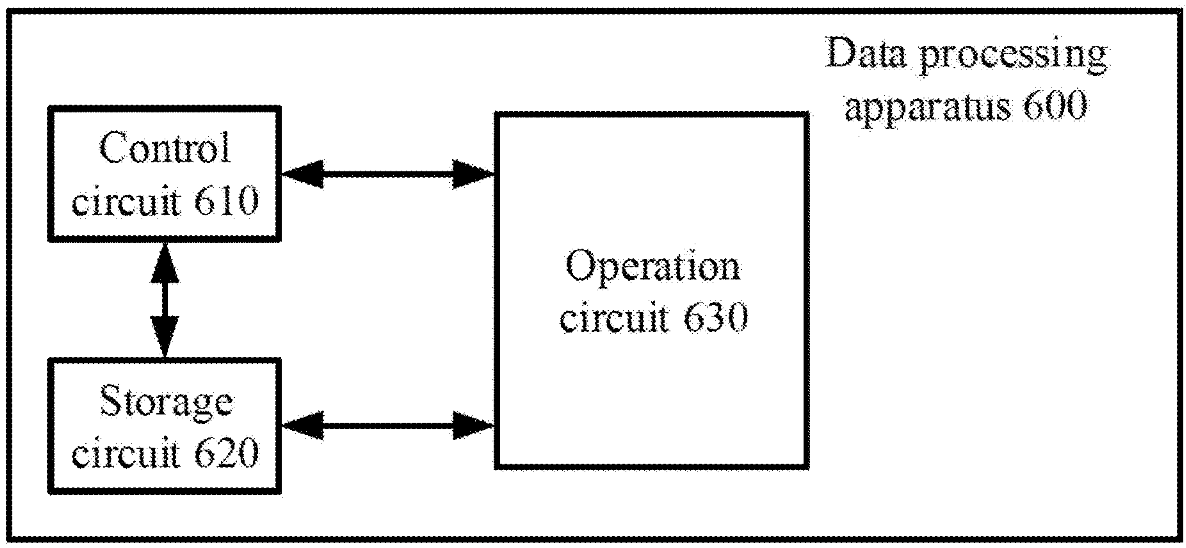
FIG. 6 shows an exemplary structural diagram of a data processing apparatus according to an embodiment of the present disclosure.

FIG. 6 shows an exemplary structural diagram of a data processing apparatus according to an embodiment of the present disclosure.

A data processing apparatus 600, for example, may be implemented in the computing apparatus 201 of FIG. 2. As shown in the figure, the data processing apparatus 600 may include a control circuit 610, a storage circuit 620, and an operation circuit 630.

A function of the control circuit 610 may be similar to that of the control unit 314 of FIG. 3. The control circuit 610, for example, may include an instruction fetch unit and an instruction decode unit. The instruction fetch unit is used for acquiring an instruction, for example, from the processing apparatus 203 of FIG. 2. The instruction decode unit is used for decoding the instruction acquired and sending a decoding result as control information to the operation unit 630 and the storage unit 620.

In an embodiment, the control circuit 610 may be configured to control the storage circuit 620 and the operation circuit 630 to perform sparsification training on a neural network model.

The storage circuit 620 may be configured to store information. The information may at least include a neural network parameter. In the embodiment of the present disclosure, the storage circuit 620 may further store a mask tensor. In this embodiment, the storage circuit, for example, may be the WRAM 332 and the NRAM 331 in FIG. 3.

Figure 7:
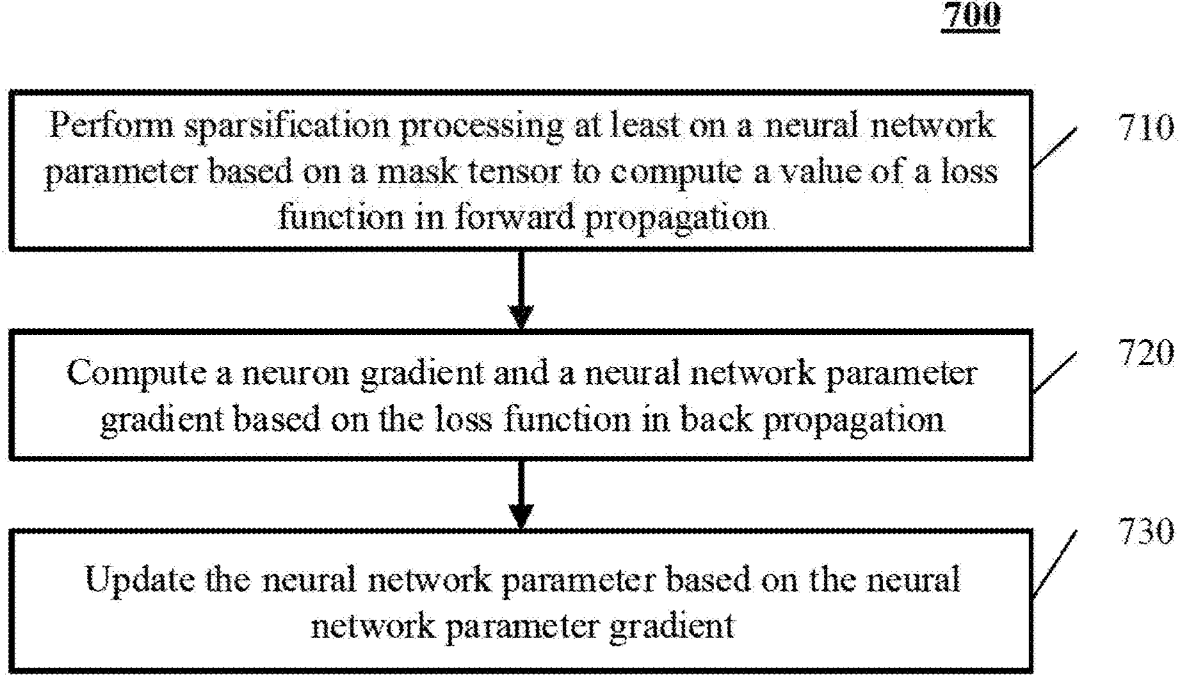
FIG. 7 shows a method performed during an iteration according to an embodiment of the present disclosure.

The operation circuit 630 may be configured to perform the sparsification training of the neural network model under the control of the control circuit 610 to perform a method for sparsification training shown in FIG. 7.

FIG. 7 shows a method performed during an iteration according to an embodiment of the present disclosure.

In a step 710, sparsification processing is performed at least on a neural network parameter based on a mask tensor to compute a value of a loss function in forward propagation.

In the embodiment of the present disclosure, there may be many cases of the mask tensor.

In some embodiments, the mask tensor is a one-dimensional tensor, which performs sparsification processing on one specified dimension of data. For example, the mask tensor performs sparsification processing on an input channel dimension of the neural network parameter.

In some embodiments, the sparsification processing may be structured sparsity processing. For example, according to a sparsity rule, n data elements are selected as valid data elements from every m data elements of a to-be-sparsified dimension of input data, where m>n. In an implementation, m=4, and n=2. In another implementation, when m=4, n may also take other values, such as 1 or 3.

At this time, the mask tensor may be the one-dimensional tensor, which may be divided into a plurality of areas of length m. In each area, n elements are 1, representing retained data positions, and m-n elements are 0, representing masked data positions.

In forward propagation, neuron (such as training data) performs an operation (such as convolution) with the neural network parameter (such as a weight).The mask tensor may be used to perform the same sparsification processing on the neuron, thereby performing a corresponding operation based on a sparsified result.

Figure 8:
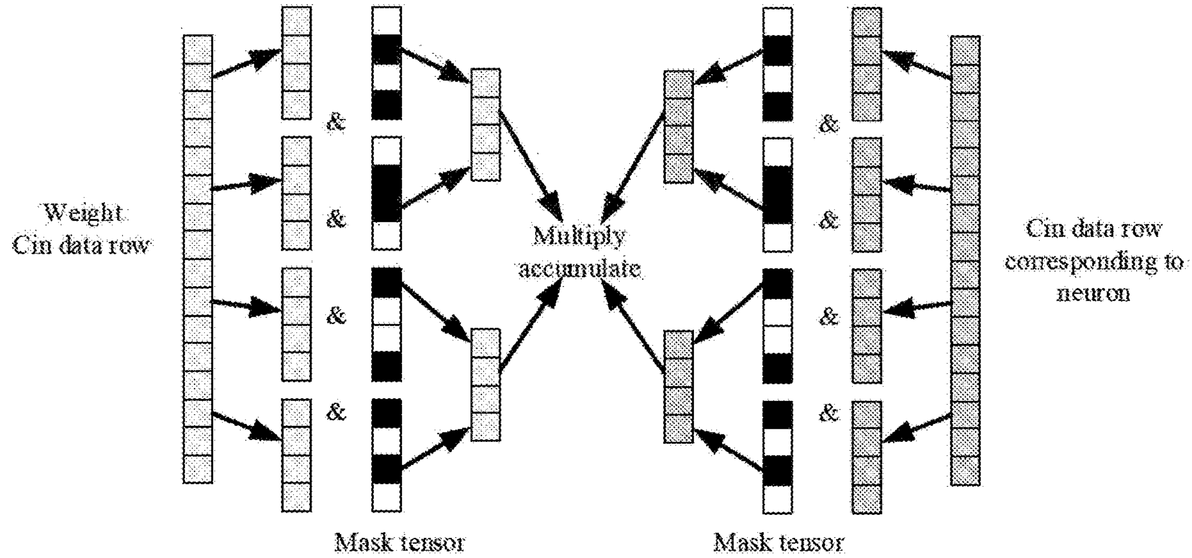
FIG. 8A shows a mask process of an exemplary one-dimensional mask tensor according to an embodiment of the present disclosure.
FIG. 8B shows a mask process of an exemplary two-dimensional mask tensor according to an embodiment of the present disclosure.

FIG. 8A shows a mask process of an exemplary one-dimensional mask tensor according to an embodiment of the present disclosure. FIG. 8A takes a convolution layer operation of a convolution neural network as an example to show a convolution operation based on sparsification in forward propagation.

As shown in the figure, a to-be-sparsified dimension is an input channel dimension. The exemplary mask tensor is a vector whose length is 16. The mask tensor is divided into four areas whose lengths are 4. In each area, two elements are 1, as shown by black squares in the figure. An input channel dimension of a weight is segmented accordingly. Each segment corresponds to one area of the mask tensor. The segment of the weight interacts with the area of the mask tensor (for example, the segment of the weight is multiplied with the area of the mask tensor in a bitwise manner through a multiplier in the operation circuit 630) to obtain a masked weight. Similarly, sparsification processing is performed on data of an input channel dimension of neuron by using the same mask tensor. Then, the weight sparsified and the neuron sparsified are operated. For example, the weight sparsified performs a multiply-accumulate operation with the neuron sparsified.

In other embodiments, the mask tensor is a two-dimensional tensor, which performs sparsification processing on two specified dimensions of data simultaneously. For example, the mask tensor performs sparsification processing on an input channel dimension of a neural network parameter and an output channel dimension of the neural network parameter simultaneously.

In some embodiments, the sparsification processing may be structured sparsity processing. For example, according to a sparsity rule, n data elements are selected as valid data elements from every m data elements of to-be-sparse dimensions of input data, where m>n. In an implementation, m=4, and n=2. In other implementations, when m=4, n may also take other values, such as 1 or 3.

At this time, the mask tensor may be a two-dimensional matrix, which may be divided into a plurality of m×m squares. In any row within each square, n elements are 1, and m-n elements are 0. Moreover, in any column within each square, n elements are 1, and m-n elements are 0. "1" represents a retained data position, and "0" represents a masked data position. In some embodiments, assuming that m is 4 and n is 2, there are 90 such 4×4 mask matrices totally. These mask matrices may be prestored in the DRAM 204.

FIG. 8B shows an exemplary mask process. It is assumed that input channels and output channels of a convolution layer constitute a 4×4 channel matrix 801, whose elements are $a_{11}$ to $a_{44}$. The channel matrix 801 is the neural network parameter. An exemplary mask matrix 802 of the 90 4×4 mask matrices described above is also shown in the figure. The mask matrix 802 is used for performing mask sparsification processing on the channel matrix 801. Specifically, if a corresponding element in the mask matrix 802 is 1, the operation circuit 630 retains an element in the channel matrix 801. If the corresponding element in the mask matrix 802 is 0, the operation circuit 630 masks the element in the channel matrix 801, and a value of the element is 0. Taking $a_{11}$ in the channel matrix 801 as an example, a corresponding element of $a_{11}$ in the mask matrix 802 is 0. As such, a corresponding element in a masked parameter matrix 803 is masked, and a value of the element is 0. In this way, all values of elements of the masked parameter matrix 803 are obtained. Since half of the elements in channel matrix 801 are masked, about half of computing may be saved.

For each training sample, in forward propagation, the operation circuit 630 performs computing after masking the neural network parameter based on the mask tensor. Finally, the value of the loss function is obtained. The loss function corresponds to an output error of the neural network.

Going back to FIG. 7, in a step 720, a neuron gradient and a neural network parameter gradient are computed based on the loss function in back propagation. In the embodiment of the present disclosure, based on the mask tensor used in the forward propagation, sparsification processing may be selectively applied or not applied in the back propagation.

In some embodiments, regardless of the mask tensor used in the forward propagation, the neuron gradient and neural network parameter gradient may be computed based on an unsparsified neural network parameter in the back propagation; and the neural network parameter is updated based on the neural network parameter gradient.

Depending on information stored in the storage circuit, in some implementations, the unsparsified neural network parameter may be a neural network parameter before sparsification processing or may be obtained after anti-sparsification processing on a sparsified neural network parameter. The anti-sparsification processing may include, according to the indication of the mask tensor, restoring the sparsified neural network parameter to a corresponding position before the sparsification processing, and filling the remaining positions with predetermined information (such as 0) to restore a shape before the sparsification processing.

In other embodiments, when the mask tensor used in the forward propagation is a two-dimensional tensor, sparsification may also be applied in the back propagation. In other words, the neural network parameter gradient and the neuron gradient are computed based on the neural network parameter sparsified, and then the neural network parameter is updated based on the neuron gradient.

In the back propagation of the training, computing involving neuron gradients and a weight gradient is as follows:

$$\text{top\_diff} \circledast W = \text{bottom\_diff} \quad (1).$$

$$\text{top\_diff} \circledast \text{bottom\_data} = \Delta W \quad (2).$$

top_diff and bottom_diff are neuron gradients respectively. W is a weight of this iteration. ΔW is a weight gradient of this iterative computing. $\circledast$ is computing in the back propagation, which is similar to a convolution operation. Relative to the direction of the back propagation, bottom_diff of a previous layer is top_diff of a current layer. bottom_diff of the current layer is top_diff of a next layer. Thus, an error may be transmitted layer by layer in the reverse direction.

In the computing of formula (1), the layout of the weight W is different from that in the forward propagation, so the direction of accumulation of the weight W in the operation is also different. In the forward propagation, the weight is used according to a (Co, Kh, Kw, Ci) dimension order or dimension shape, where Ci represents an input channel dimension, Co represents an output channel dimension, Kh is a convolution kernel height dimension, and Kw is a convolution kernel width dimension. During the convolution operation of the forward propagation, operation results are accumulated in the Ci direction. However, in the back propagation, the weight is used according to a (Ci, Kh, Kw, Co) dimension order or dimension shape. During the operation of the back propagation, the operation results are accumulated in the Co direction. Therefore, in order to maintain the mathematical consistency of operation gradients in the back propagation, it is required to perform sparsification in the Ci and Co directions simultaneously.

When sparsification processing is performed in the back propagation, a reverse mask tensor may be used to mask the neural network parameter to obtain the neural network parameter sparsified.

The reverse mask tensor may be consistent with the mask tensor used in the forward propagation. However, as mentioned above, the layout of the weight in the back propagation is different, and the direction of accumulation of the weight in the operation is also different, so the mask tensor in the forward propagation may not be used directly. In some implementations, the mask tensor used in the forward propagation (or called a forward mask tensor) may be used after a dimension conversion. Various existing dimension conversion methods (such as dimension transposition and data deformation) may be used to convert the mask tensor into the layout required in the back propagation to be used as the reverse mask tensor. In other implementations, a mask tensor generation process used during the forward propagation may also be repeated in the back propagation to generate the reverse mask tensor. However, mask computing in the Ci direction is implemented during the forward propagation, and mask computing in the Co direction is implemented during the back propagation.

Continuing FIG. 7, in a step 730, the neural network parameter is updated based on the neural network parameter gradient.

Sparsification training of the embodiment of the present disclosure may include several training phases, such as a no-mask phase, a mask adjustment phase, and a mask fixing phase. Processing of each phase will be described in detail in combination with drawings below.

Based on different phases of sparsification training, the update of the neural network parameter may also be different.

In some embodiments, the update of the neural network parameter may be the update of the unsparsified neural network parameter. For example, in the mask adjustment phase, in each iteration, the unsparsified neural network parameter is updated. Further, in the mask adjustment phase, in every K (K≥1) iteration(s), the mask tensor updated may be generated based on the unsparsified neural network parameter updated, so that the mask tensor may be optimized and performance may be improved during the training.

In other embodiments, the update of the neural network parameter may be the update of the sparsified neural network parameter. For example, in the mask fixing phase, since the mask tensor has been fixed, a sparsification mode of the neural network parameter is fixed. In other words, valid data elements in the neural network parameter are fixed. Therefore, for the update of the neural network parameter, only the valid data elements are updated; in other words, the sparsified neural network parameter is updated. In an implementation, updating the neural network parameter may include: performing sparsification processing on the neuron gradient by using the mask tensor; and updating the sparsified neural network parameter based on the neuron gradient sparsified.

The fixed mask tensor in the mask fixing phase may be a mask tensor determined finally in a previous training phase (such as the mask adjustment phase). Depending on different forms of the mask tensor, there may be different methods to generate or update the mask tensor.

When the mask tensor is a one-dimensional tensor, which is a mask vector, the mask tensor may mask only a single parameter. The mask tensor may be generated based on the unsparsified neural network parameter. For example, n data elements with relatively large absolute values are selected as valid data elements from every m data elements of a specified dimension of the neural network parameter, where m>n; and the mask tensor is generated based on positions of n valid data elements in the m data elements. In some implementations, the specified dimension may be the input channel dimension (Ci). Specifically, this embodiment divides parameters into a plurality of areas by taking a specific parameter quantity m as a unit, where parameters in each area are sorted according to sizes of absolute values of the parameters. Next, in the mask tensor, elements whose positions are relative to first n parameters with relatively large absolute values in each area are set as 1, and elements whose positions are relative to m-n parameters with relatively small absolute values in each area are set as 0. The reason is that mask adjustment parameters with relatively large absolute values contain more distinct features and are worth keeping for further computing. There are many methods to filtrate the mask adjustment parameters with relatively large absolute values, and the present disclosure does not limit this aspect.

Figure 9:
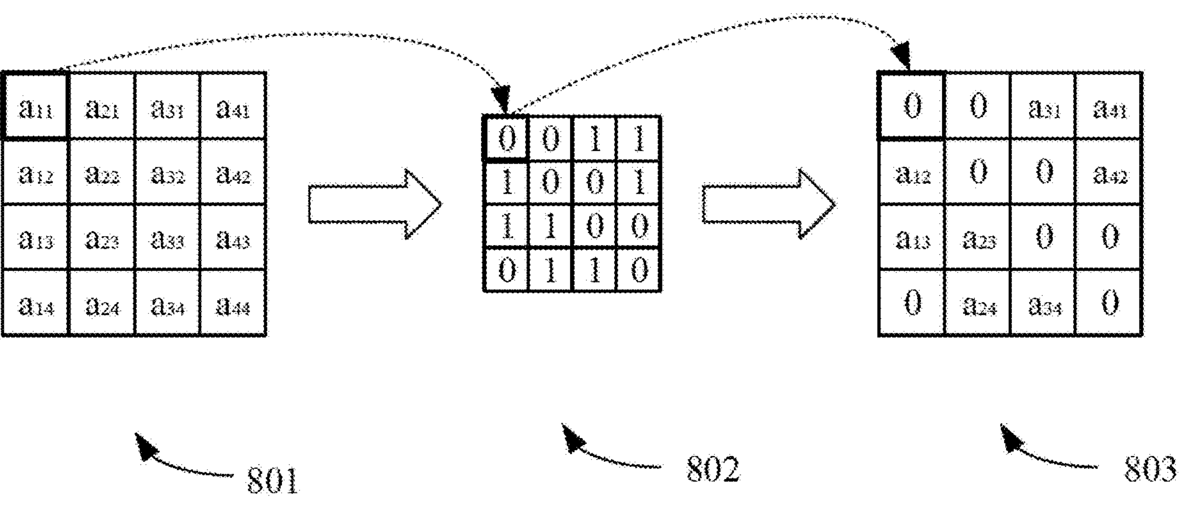
FIG. 9 shows a schematic diagram of an exemplary update of a mask vector.

FIG. 9 shows a schematic diagram of an exemplary update of a mask vector and illustrates the aforementioned update of the mask vector with examples. This figure shows a parameter vector 901 with a total of 64 parameters, including $b_{01}$ to $b_{64}$, respectively. In this step, each element value of the mask vector is updated to retain mask adjustment parameters with relatively large absolute values and mask mask adjustment parameters with relatively small absolute values. The updated mask adjustment parameters are divided into a plurality of areas in units of every four mask adjustment parameters (m is 4). As shown in the figure, $b_{01}$ to $b_{04}$ constitute a first area 902, $b_{05}$ to $b_{08}$ constitute a second area 903, and $b_{61}$ to $b_{64}$ constitute a sixteenth area 917. Then, mask adjustment parameters in each area are sorted according to sizes of absolute values of the mask adjustment parameters. It is assumed that sizes of absolute values of parameters in the first area 902 are sorted as $b_{02}>b_{01}>b_{04}>b_{03}$, sizes of absolute values of parameters in the second area 903 are sorted as $b_{07}>b_{05}>b_{06}>b_{08}$, and sizes of absolute values of parameters in the sixteenth area 917 are sorted as $b_{64}>b_{63}>b_{61}>b_{62}$. The mask adjustment parameters in each area are sorted according to the sizes of the absolute values of the mask adjustment parameters. Then, in these mask vectors, elements whose positions are relative to first two (n is 2) parameters with relatively large absolute values in each area are set as 1, and elements whose positions are relative to two (m−n=2) parameters with relatively small absolute values in each area are set as 0. Taking the first area 902 as an example, in the mask vectors, elements corresponding to $b_{02}$ and $b_{01}$ are set as 1, and elements corresponding to $b_{04}$ and $b_{03}$ are set as 0. Each area is adjusted in this way, and finally, an updated mask vector 918 is obtained. The updated mask vector 908 retains mask adjustment parameters with relatively large absolute values after the update and masks mask adjustment parameters with relatively small absolute values after the update. To sum up, every four mask adjustment parameters are used as an area, and element values of the mask vectors are updated in a manner of 2 out of 4 in each area.

This embodiment completely sorts the mask adjustment parameters in each area to identify n mask adjustment parameters with relatively large absolute values and m-n mask adjustment parameters with relatively small absolute values. However, in the present disclosure, it is not necessarily required to completely sort the mask adjustment parameters, as long as the n mask adjustment parameters with relatively large absolute values and the m-n mask adjustment parameters with relatively small absolute values are identified. Sizes of the n mask adjustment parameters with relatively large absolute values and sizes of the m-n mask adjustment parameters with relatively small absolute values are not necessary information. Taking the first area 902 as an example, the present disclosure is only required to judge that $b_{01}$ and $b_{02}$ are two mask adjustment parameters with relatively large absolute values, and $b_{03}$ and $b_{04}$ are two mask adjustment parameters with relatively small absolute values. Sizes of absolute values of $b_{01}$ and $b_{02}$ and sizes of absolute values of $b_{03}$ and $b_{04}$ are not critical and may not be sorted to save computing resources.

If the mask tensor is multi-dimensional (for example, the mask tensor is two-dimensional), training data may perform computing of sum of products with each parameter tensor after masking to obtain a parameter evaluation value. The purpose of obtaining the parameter evaluation value is to compute the amount of information retained after the masking of the mask tensor. If the parameter evaluation value is large, it is represented that not much information is lost because of the masking, the amount of operation of the mask tensor is reduced while most of the information are retained, and the mask tensor is in high-quality. On the contrary, if the parameter evaluation value is small, it is represented that too much information is lost after the masking, and the mask tensor is not high-quality.

Specifically, a two-dimensional mask tensor may be determined by: presetting a specific number of two-dimensional mask tensors, and then selecting one mask tensor from these preset two-dimensional mask tensors as a mask tensor to be used. Each dimension of these two-dimensional mask tensors includes m elements, of which n elements are 1, m-n elements are 0, and m>n. As mentioned before, when m=4 and n=2, there are 90 4×4 mask matrices totally. Therefore, one of these 90 mask matrices is selected as the mask tensor.

Selecting one mask tensor from these two-dimensional mask tensors with a specific quantity (such as 90) may include: masking two specified dimensions of the neural network parameter separately based on each preset two-dimensional mask tensor to obtain masked parameter tensors; performing a product sum operation on training data of a neural network layer based on each masked parameter tensor to obtain a parameter evaluation value; and selecting a two-dimensional mask tensor that generates the largest of all parameter evaluation values as a selected mask tensor. In some implementations, the two specified dimensions may be the input channel dimension and the output channel dimension. The product sum operation may also be viewed as a convolution operation. However, the accumulation of the operation is not performed in the input channel dimension, but only in the depth direction. Therefore, the operation may also be called a convolution operation in the depth direction. Here, the depth direction is a Kw×Kh dimension.

Figure 10:
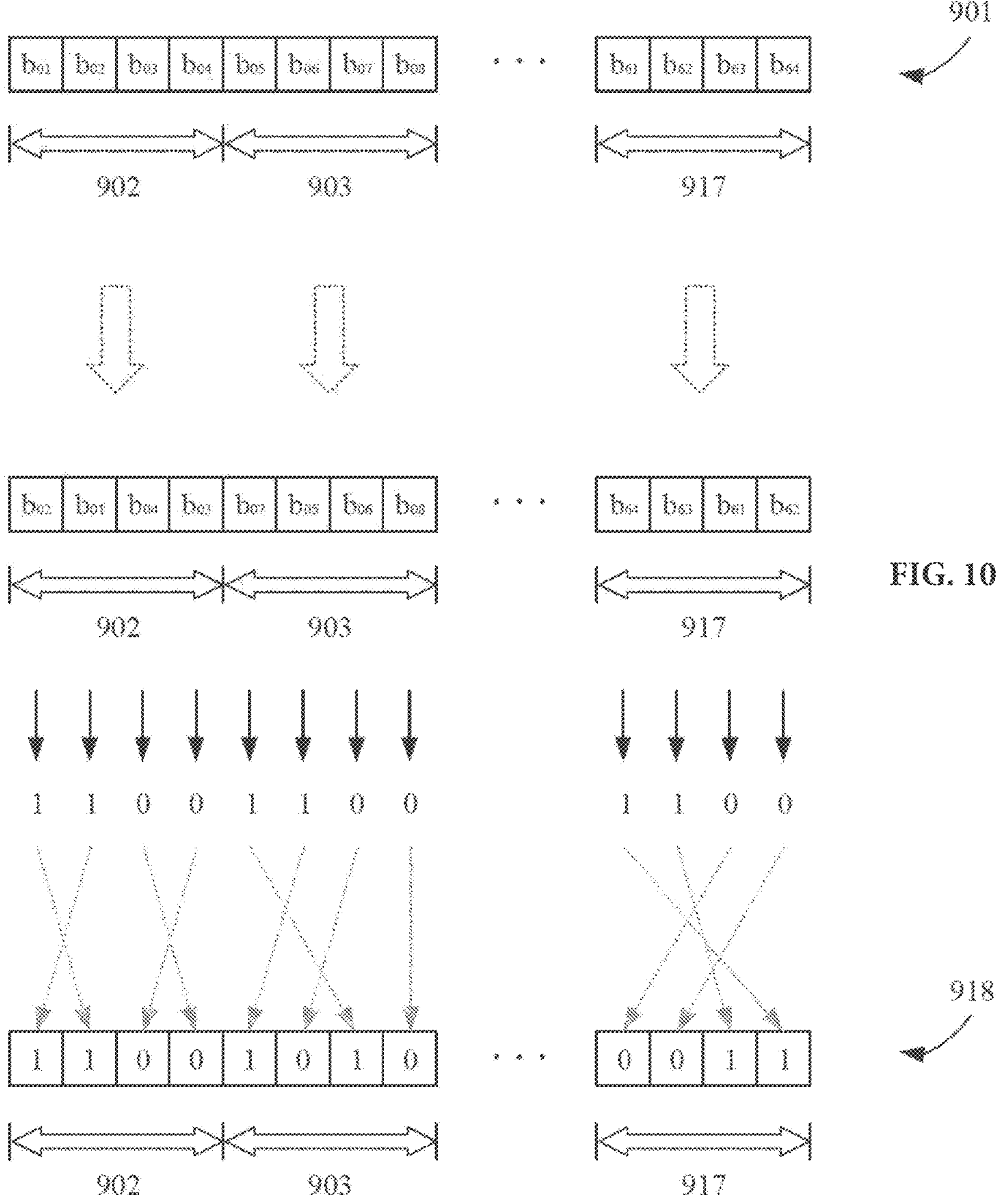
FIG. 10 shows a schematic diagram of an exemplary product sum computing process.

FIG. 10 shows an exemplary product sum computing process. It is assumed that a training data matrix 1001 is one of training data in a training set. Originally, the matrix should be computed with the channel matrix 801 in FIG. 8, but now, the matrix performs product sum computing with the masked parameter matrix 803 to identify the amount of information after masking. There are many methods for such product sum computing. For example, the training data matrix 1001 is multiplied with corresponding elements of the masked parameter matrix 803, and then absolute values of products are taken to be summed, so as to obtain a parameter evaluation value $S_1$, which is $$S_1=|d_{31}\cdot a_{31}|+|d_{41}\cdot a_{41}|+|d_{12}\cdot a_{12}|+|d_{42}\cdot a_{42}|+|d_{13}\cdot a_{13}|+|d_{23}\cdot a_{23}|+|d_{24}\cdot a_{24}|+|d_{34}\cdot a_{34}|.$$

For another example, absolute values of the training data matrix 1001 and absolute values of corresponding elements of the masked parameter matrix 803 are taken to be multiplied, and then products are summed, so as to obtain a parameter evaluation value $S_2$, which is $$S_2=|d_{31}\cdot a_{31}|+|d_{41}\cdot a_{41}|+|d_{12}\cdot a_{12}|+|d_{42}\cdot a_{42}|+|d_{13}\cdot a_{13}|+|d_{23}\cdot a_{23}|+|d_{24}\cdot a_{24}|+|d_{34}\cdot a_{34}|.$$

The parameter evaluation value reflects a result similar to absolute value computing. The parameter evaluation value $S_1$ or $S_2$ shows the amount of information retained after masking. The larger the parameter evaluation value, the more information retained. In an application scenario, either a computing method of the parameter evaluation value $S_1$ or $S_2$ may be selected. However, in another application scenario, both computing methods of the parameter evaluation value $S_1$ and $S_2$ may be used at the same time. The present disclosure does not limit this.

All mask tensors are masked and parameter evaluation values are obtained. In the aforementioned example, all 90 4×4 mask matrices are masked, and 90 parameter evaluation values are obtained. A mask tensor with the largest parameter evaluation value is selected as the updated mask tensor. In other words, the mask tensor with the largest parameter evaluation value is selected as a parameter mask tensor. There are many methods to select the largest parameter evaluation value. For example, all parameter evaluation values may be sorted according to sizes of numerical values of the parameter evaluation values to obtain the largest parameter evaluation value; or simply a two-input comparator is used to compare the parameter evaluation values, where the larger one is left and compared with a next parameter evaluation value, and after 90 parameter evaluation values are compared, the remaining one is the largest parameter evaluation value. If a plurality of mask tensors have the same largest parameter evaluation value, one of the plurality of mask tensors may be selected based on specific rules or hardware features, such as selecting a parameter evaluation value that is first sorted, selecting a parameter evaluation value that is last sorted, selecting a parameter evaluation value that is first left, selecting a parameter evaluation value that is last left, or selecting a parameter evaluation value randomly.

The mask tensor with the largest parameter evaluation value is a mask tensor that retains the most information. This embodiment uses this mask tensor as the parameter mask tensor.

In this embodiment, the mask tensor may be updated in each iteration or every one-generation training. If the neural network parameter is updated after training of each training sample during the training, mask tensors of high quality are updated in each iteration. If the neural network parameter is updated in each iteration, and parameter mask tensors of high quality are updated after every one-generation training.

Those skilled in the art may understand that, although the above describes the generation of the mask tensor based on the update process, when the mask tensor is generated for the first time, the mask tensor may be generated in a similar way but based on different neural network parameters. Depending on phases included in the training process, when the mask tensor is generated for the first time, the neural network parameter on which the generation of the mask tensor is based may be a randomly initialized parameter or a neural network parameter determined after training in the no-mask phase.

As mentioned before, the sparsification training of the embodiment of the present disclosure may include several training phases, such as the no-mask phase, the mask adjustment phase, and the mask fixing phase. Processing of each phase will be described in detail in combination with drawings below.

Figure 11:
FIG. 11 shows a flowchart of a sparsification training method according to another embodiment of the present disclosure.
Figure 11:
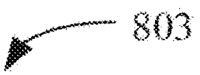

FIG. 11 shows an exemplary flowchart of a no-mask phase and a mask adjustment phase. In the no-mask phase, the processing apparatus 203 only trains a neural network parameter. In other words, mask sparsification is not performed on the neural network parameter, and a mask tensor is updated while the parameter is trained after the no-mask phase ends and the mask adjustment phase begins.

As shown in FIG. 11, in a step 1101, the control circuit 610 is first set to enter the no-mask phase. In the no-mask phase, this embodiment does not mask the neural network parameter, and all elements of the parameter participate in the training. At the beginning of the training, a value of the parameter may be randomly generated. For the convenience of discrimination, a parameter involved in the training in the no-mask phase is called a no-mask parameter.

In a step 1102, the operation circuit 630 computes a value of a loss function based on the no-mask parameter in forward propagation. In this step, the operation circuit 630 adopts a method for computing the loss function in the prior art. Specifically, in the forward propagation, training samples are input; through computing of each layer of a neural network, input feature maps are gradually extracted into abstract features; and the loss function is obtained by using the computing of a forward propagation result and a real value.

In a step 1103, the operation circuit 630 computes a partial derivative of the loss function to the no-mask parameter in back propagation. The operation circuit 630 adopts a gradient descent method and computes a partial derivative of the loss function to each no-mask parameter through a chain rule.

In a step 1104, the operation circuit 630 updates the no-mask parameter based on the partial derivative and uses the no-mask parameter updated as an initial value of a mask adjustment parameter. First, the operation circuit 630 updates no-mask parameters of the whole neural network by multiplying a stride according to the influence of the no-mask parameter on an error. In this embodiment, the operation circuit 630 may also update the no-mask parameter based on the partial derivative in each training sample or each iteration.

This embodiment may repeats steps 1102, 1103 and 1104 in a specific number of one-generation training to update the no-mask parameter multiple times. After the last update, the no-mask parameter updated will be used as an initial value of a mask adjustment parameter in a next phase.

In a step 1105, the control circuit 610 is set to enter the mask adjustment phase. In other words, a mask tensor is used to mask part of parameters. During the training, in the prior art, all parameters (such as a weight, a bias, and the like) are trained only, and the parameters are usually not masked. In this embodiment, the parameters are masked. The purpose is to reduce the participation of the parameters in the training phase, avoid overfitting to reduce computing amount, and simultaneously, update the mask tensor with the update of the parameters in the training process, so as to obtain a more ideal mask tensor. At the beginning of the mask adjustment phase, as mentioned before, the initial value of the mask adjustment parameter is the no-mask parameter that is finally updated in the no-mask phase. However, the mask tensor may obtain the initial value of the mask adjustment parameter based on the no-mask parameter that is finally updated in the no-mask phase. The obtaining method is the same as the generation method of the mask tensor described above, which will not be repeated herein.

In a step 1106, the mask adjustment parameter is masked based on the mask tensor to compute the value of the loss function in the forward propagation. In a step 1107, a partial derivative of the loss function to the mask adjustment parameter is computed in the back propagation. In a step 1108, the mask adjustment parameter is updated based on the partial derivative. In a step 1109, the mask tensor is updated based on the mask adjustment parameter updated. These steps may be referred to the aforementioned description in combination with FIG. 7 and will not be repeated herein.

This embodiment does not limit the number of times of one-generation training in the no-mask phase and the mask adjustment phase. Those skilled in the art may make arrangements according to specific situations, and the numbers of times of one-generation training in the no-mask phase and the mask adjustment phase are not necessarily the same.

Another embodiment of the present disclosure also provides a solution for sparsification training of the neural network model based on the aforementioned hardware environment. Different from the aforementioned embodiment, training of this embodiment is divided into three phases: a no-mask phase, a mask adjustment phase, and a mask fixing phase. In the no-mask phase, the processing apparatus 203 only trains parameters and does not mask the parameters. In the mask adjustment phase, the processing apparatus 203 uses an updated no-mask parameter as an initial value and trains the parameters and mask tensors simultaneously. In the mask fixing phase, the processing apparatus 203 uses an updated mask adjustment parameter and an updated mask tensor as initial values and continues to train the parameters without changing or updating the mask tensors.

Figure 12:
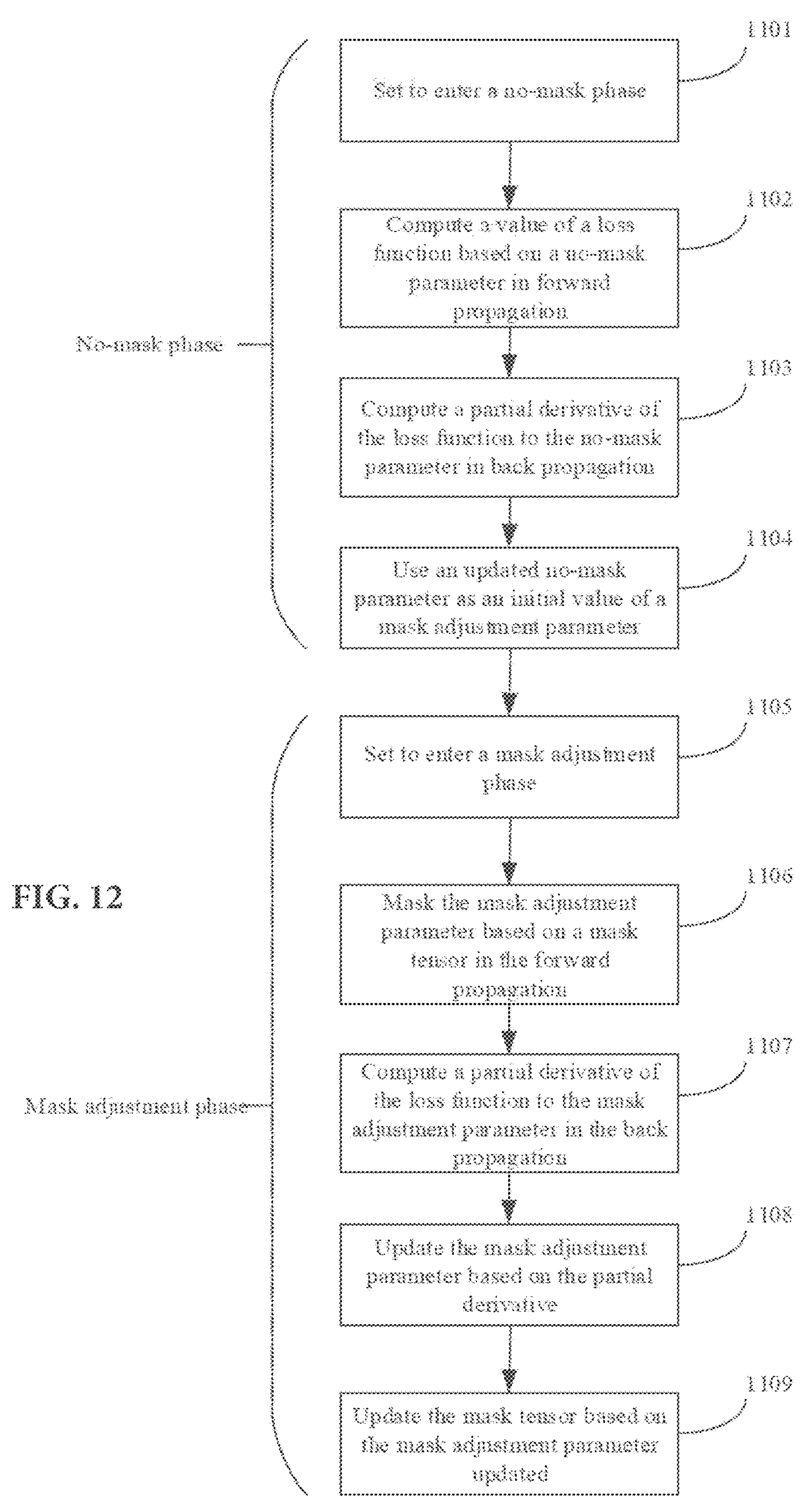
FIG. 12 shows a flowchart of a sparsification training method during a mask fixing phase according to another embodiment of the present disclosure.

Processes performed by this embodiment in the no-mask phase and the mask adjustment phase are shown in FIG. 11 and will not be repeated herein. After entering the mask fixing phase, a related process is shown in FIG. 12.

In a step 1201, the control circuit 610 is first set to enter the mask fixing phase. In the mask fixing phase, the control circuit 610 uses a mask adjustment parameter updated in the mask adjustment phase as an initial value of a parameter in this phase (hereinafter referred to as a mask fixing parameter). This embodiment completes the update of the mask tensor in the mask adjustment phase, so the mask tensor will not be updated in this phase. Instead, the mask fixing parameter is masked based on the mask tensor updated finally in the mask adjustment phase, and the mask fixing parameter is continued to be trained.

This embodiment repeats following steps in at least one one-generation training.

In a step 1202, the operation circuit 630 masks the mask fixing parameter based on the mask tensor updated in the mask adjustment phase to compute a value of a loss function in forward propagation.

In a step 1203, the operation circuit 630 computes a partial derivative of the loss function to the mask fixing parameter in back propagation.

In a step 1204, an update unit 64 updates the mask fixing parameter based on the partial derivative.

The steps may be referred to the aforementioned description in combination with FIG. 7 and will not be repeated herein.

Training of this embodiment is divided into three phases. In the no-mask phase, there is no mask tensor to mask the parameter, and the parameter is trained only, so as to accelerate the convergence of the parameter. In the mask adjustment phase, the initial value of the parameter is no longer generated randomly, but the initial value of the parameter is the trained no-mask parameter, which is helpful to quickly obtain an ideal mask tensor. After the mask tensor is updated, the training enters the mask fixing phase, and the mask tensor updated is used to continue to train the parameter. Finally, the parameter trained will better match the mask tensor.

Figure 13:
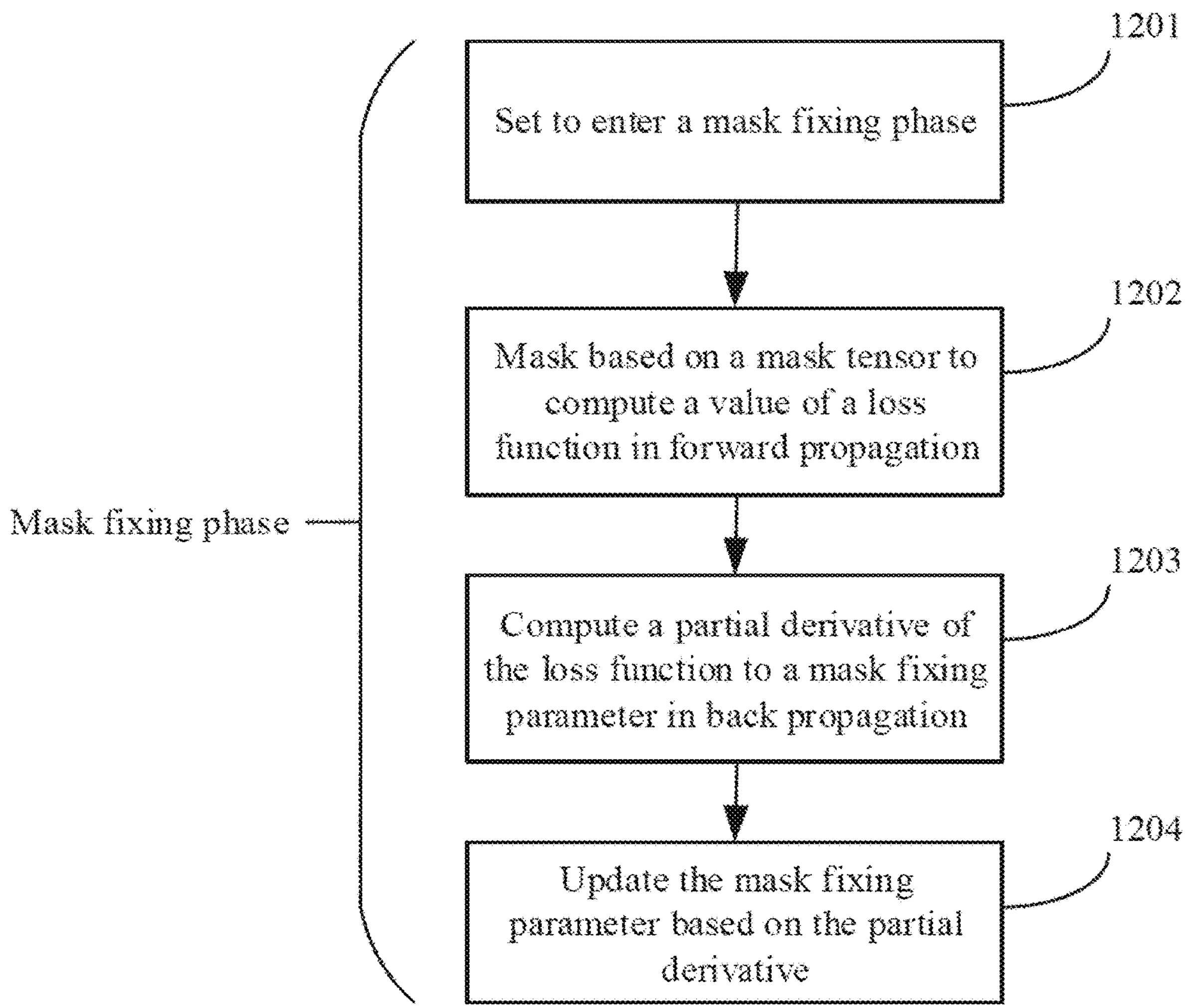
FIG. 13 shows a schematic diagram of several implementations of the present disclosure for sparsification training of a neural network model.
Figure 14:
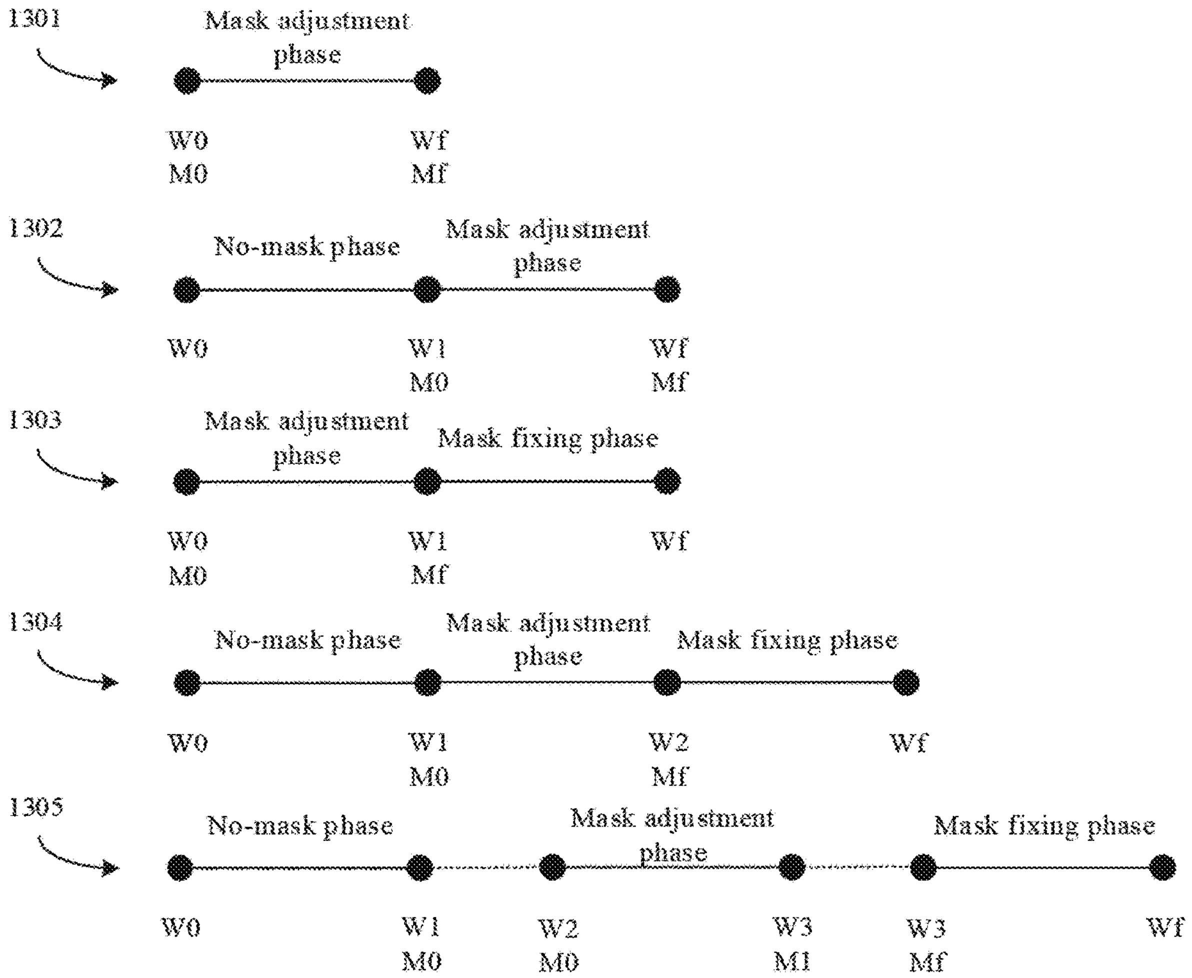

To sum up, those skilled in the art may understand that, when the sparsification training of the neural network model is performed in the present disclosure, there may be several implementations as shown in FIG. 13.

In an implementation 1301, there is a mask adjustment phase only. A parameter initial value W0 is generated randomly. A mask tensor initial value M0 is determined based on the parameter initial value W0. A mask matrix is updated while a parameter is trained, so as to obtain a trained parameter Wf and an updated mask tensor Mf.

In an implementation 1302, there are a no-mask phase and the mask adjustment phase only. In the no-mask phase, the parameter is trained only. The parameter initial value W0 is generated randomly. An updated parameter W1 is obtained after the training. In the mask adjustment phase, the mask matrix is updated while the parameter is trained. The parameter initial value of this phase is the updated parameter W1, and the mask tensor initial value M0 is obtained by using the updated parameter W1. Finally, the trained parameter Wf and the updated mask tensor Mf are obtained.

In an implementation 1303, there are the mask adjustment phase and a mask fixing phase only. In the mask adjustment phase, the parameter initial value W0 is generated randomly. The mask tensor initial value M0 is determined based on the parameter initial value W0. The mask matrix is updated while the parameter is trained, so as to obtain the updated parameter W1 and the updated mask tensor Mf. In the mask fixing phase, the updated mask tensor Mf is used to mask the parameter to continue the training. The parameter initial value of this phase is the updated parameter W1. Finally, the trained parameter Wf is obtained.

In an implementation 1304, there are the no-mask phase, the mask adjustment phase, and the mask fixing phase. In the no-mask phase, the parameter is trained only. The parameter initial value W0 is generated randomly. The updated parameter W1 is obtained after the training. In the mask adjustment phase, the mask matrix is updated while the parameter is trained. The parameter initial value of this phase is the updated parameter W1, and the mask tensor initial value M0 is obtained by using the updated parameter W1. Finally, an updated parameter W2 and the updated mask tensor Mf are obtained. In the mask fixing phase, the updated mask tensor Mf is used to mask the parameter to continue the training. The parameter initial value of this phase is the updated parameter W2. Finally, the trained parameter Wf is obtained.

In an implementation 1305, in addition to the no-mask phase, the mask adjustment phase, and the mask fixing phase, there are other training phases (represented by dashed lines) between the no-mask phase and the mask adjustment phase and between the mask adjustment phase and the mask fixing phase. In the no-mask phase, the parameter is trained only. The parameter initial value W0 is generated randomly. The updated parameter W1 is obtained after the training. Then, any training phase disclosed or not disclosed in the present disclosure may be followed to train the parameter or update the mask matrix. Assuming that this phase is the mask fixing phase, the parameter initial value of this phase is the updated parameter W1, and the mask tensor initial value M0 is obtained by using the updated parameter W1, so as to obtain the updated parameter W2.

Next, the training enters the mask adjustment phase. The mask matrix is updated while the parameter is trained. The parameter initial value of this phase is the updated parameter W2, and the mask tensor initial value is still the mask tensor M0, so as to obtain an updated parameter W3 and the updated mask tensor M1. Then, any phase disclosed or not disclosed in the present disclosure may be followed to train the parameter or update the mask matrix. It is assumed that this phase is the parameter fixing phase. In this phase, the parameter is fixed and is not trained, and the mask tensor is trained only. The parameter initial value of this phase is the updated parameter W3, and the mask tensor initial value is the updated mask tensor M1, so as to obtain the updated mask tensor Mf.

Finally, in the mask fixing phase, the updated mask tensor Mf is used to mask the parameter to continue the training. The parameter initial value of this phase is the updated parameter W3. Finally, the trained parameter Wf is obtained.

Various implementations shown in FIG. 13 are examples only. Upon reference to the present disclosure, those skilled in the art may expand other implementations without creative effort. These implementations are within the scope of the present disclosure.

The present disclosure does not limit the numbers of times of one-generation training of various implementations in each phase. Those skilled in the art may make arrangements according to specific situations. Moreover, the number of times of one-generation training in each phase does not have to be the same.

The aforementioned embodiments do not necessarily perform all preset one-generation training of a specific number of times. The control circuit 610 may further judge whether a percentage that all element values of the parameter mask tensor are not changed reaches a threshold in two consecutive one-generation training. If the percentage that all element values of the parameter mask tensor are not changed reaches the threshold in the two consecutive one-generation training, it is represented that training results have been basically converged, and more training also play a limited role in precision improvement. Therefore, the mask adjustment phase is ended, and the training is completed. Such a threshold is generally set above 70%. In other words, the training is stopped once the percentage that all element values of the parameter mask tensor are not changed exceeds 70%. The present disclosure does not limit the threshold, and the threshold may be 80%, 90%, 100%, or any other percentage.

In the embodiment of the present disclosure, in order to save overheads brought by sparsification and anti-sparsification processes, different sparsification data flow structures may be used for related operations in different phases of the training to obtain optimal operation and IO performance.

In some embodiments, in the mask adjustment phase, the mask tensor may be updated based on the neural network parameter updated, and results generated during the updating process may include a sparsified result (such as a sparsified weight) of the neural network parameter and the mask tensor. The mask tensor may be used for sparsification processing of training data. Then, subsequent operations may be performed based on the neural network parameter sparsified and the training data sparsified. During the back propagation of the mask adjustment phase, a neuron gradient and a neural network parameter gradient may be computed based on a current unsparsified neural network parameter. Moreover, the unsparsified neural network parameter may be updated accordingly. Or, during the back propagation of the mask adjustment phase, the neural network parameter may be sparsified based on the mask tensor used in the forward propagation. Moreover, the neuron gradient and the neural network parameter gradient are computed based on the neural network parameter sparsified, and the unsparsified neural network parameter is updated accordingly. For sparsification during the back propagation, reference may be made to the above description. Here will not repeat.

In other embodiments, in the mask fixing phase, at this time, the mask tensor is fixed and is not required to be updated in real-time. Therefore, fixed mask tensors may be stored in the storage circuit for later use. The fixed mask tensors may include a forward mask tensor used in the forward propagation and a reverse mask tensor used in the back propagation. There are different storage solutions for the neural network parameter.

In an implementation, the unsparsified neural network parameter may be stored in the storage circuit. At this time, in the forward propagation, it is required to use the stored mask tensor to perform a sparsification operation on the neural network parameter. In the back propagation, the unsparsified neural network parameter may be used to directly participate in neuron gradient computing (such as the aforementioned formula (1)). Moreover, the unsparsified neural network parameter is updated and stored in the storage circuit again. Or, in the back propagation, the reverse mask tensor stored in the storage circuit may be used to perform sparsification processing on the unsparsified neural network parameter. Based on this, the neuron gradient is then computed. Moreover, the unsparsified neural network parameter is updated accordingly.

In another implementation, the sparsified neural network parameter may be stored in the storage circuit. At this time, in the forward propagation, the sparsified neural network parameter may be directly involved in a forward operation, and is not required to be sparsified. In the back propagation, it is required to update the sparsified neural network parameter. Therefore, the mask tensor stored in the storage circuit may be used to perform sparsification processing on the neural network parameter gradient, and then the sparsified neural network parameter is updated. During neuron gradient computing of the back propagation, sparsification processing may be performed or not performed. When the sparsification processing is not performed, it is required to perform anti-sparsification processing on the sparsified neural network parameter. Then, the neuron gradient is computed based on the neural network parameter anti-sparsified. When the sparsification processing is performed, the reverse mask tensor stored in the storage circuit may be used to perform sparsification processing on the anti-sparsified neural network parameter. Based on this, the neuron gradient is then computed.

Another embodiment of the present disclosure shows a computer readable storage medium, on which computer program codes for sparsification training of a neural network model are stored. When the computer program codes are run by a processor, the method of the aforementioned embodiments is performed. In some implementation scenarios, an integrated unit may be implemented in the form of a software program unit. If the integrated unit is implemented in the form of the software program unit and sold or used as an independent product, the integrated unit may be stored in a computer-readable memory. Based on this, when the solution of the present disclosure is embodied in the form of a software product (such as a computer-readable storage medium), the software product may be stored in a memory. The software product may include several instructions used to enable a computer device (such as a personal computer, a server, or a network device, and the like) to perform part or all of steps of the method of the embodiments of the present disclosure. The memory includes but is not limited to an USB, a flash disk, a read only memory (ROM), a random access memory (RAM), a mobile hard disk, a magnetic disk, or an optical disc, and other media that may store a program code.

In the aforementioned embodiments, after the training, when the computing apparatus 201 performs inference, the parameter mask tensor updated is used to mask the parameter trained, so as to control a processing area of a feature map input to the neural network model. As such, on the one hand, expected precision may be achieved; on the other hand, during the inference, computing amount may be reduced, and the purpose of sparsification may be completed.

According to different application scenarios, an electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be further used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with hardware information of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It is required to be explained that for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and units involved thereof are not necessarily required for the implementation of a certain solution or some solutions of the present disclosure. Additionally, according to different solutions, descriptions of some embodiments of the present disclosure have their own emphases. In view of this, those skilled in the art may understand that for a part that is not described in detail in a certain embodiment of the present disclosure, reference may be made to related descriptions in other embodiments.

In terms of specific implementations, according to the present disclosure and under the teaching of the present disclosure, those skilled in the art may understand that several embodiments disclosed in the present disclosure may be implemented through other methods that are not disclosed in the present disclosure. For example, for units in the electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may bedirect or indirect coupling between the units or components. In some scenarios, the direct or indirect coupling relates to a communication connection using an interface, where the communication interface may support electrical, optical, acoustic, magnetic, or other forms of signal transmission.

In the present disclosure, units described as separate components may be or may not be physically separated. Components shown as units may be or may not be physical units. The components or units may be located in a same position or distributed to a plurality of network units. Additionally, according to actual requirements, some or all of the units may be selected for achieving the purpose of the solution described in embodiments of the present disclosure. Additionally, in some scenarios, a plurality of units in the embodiments of the present disclosure may be integrated into one unit, or each of the units may be physically separated.

In some other implementation scenarios, the integrated unit may be implemented in the form of hardware. The hardware may be a specific hardware circuit, which may include a digital circuit and/or an analog circuit. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the storage unit or the storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

The foregoing may be better understood according to following articles:

Article 1. A method for sparsification training of a neural network model by a data processing apparatus, including:

performing sparsification processing at least on a neural network parameter based on a mask tensor to compute a value of a loss function in forward propagation;

computing a neuron gradient and a neural network parameter gradient based on the loss function in back propagation; and updating the neural network parameter based on the neural network parameter gradient.

Article 2. The method of article 1, further including:

computing the neuron gradient and the neural network parameter gradient based on an unsparsified neural network parameter in the back propagation; and updating the neural network parameter based on the neural network parameter gradient.

Article 3. The method of article 2, further including:

performing anti-sparsification processing on a sparsified neural network parameter to obtain the unsparsified neural network parameter.

Article 4. The method of article 1, further including:

computing the neuron gradient and the neural network parameter gradient based on the neural network parameter sparsified in the back propagation; and updating the neural network parameter based on the neuron gradient.

Article 5. The method of article 4, further including:

performing sparsification processing on the neural network parameter based on a reverse mask tensor to obtain the neural network parameter sparsified in the back propagation.

Article 6. The method of any one of articles 1 to 3, where the mask tensor is a one-dimensional tensor.

Article 7. The method of article 6, where the one-dimensional tensor performs sparsification processing on an input channel dimension of the neural network parameter.

Article 8. The method of articles 1 to 5, where the mask tensor is a two-dimensional tensor.

Article 9. The method of article 8, where the two-dimensional tensor performs sparsification processing on an input channel dimension of the neural network parameter and an output channel dimension of the neural network parameter.

Article 10. The method of to article 5, where, when the mask tensor is a two-dimensional tensor, the reverse mask tensor is generated by performing a dimension conversion on the mask tensor.

Article 11. The method of article 1, where updating the neural network parameter includes updating an unsparsified neural network parameter.

Article 12. The method of article 11, further including:

generating the mask tensor based on the unsparsified neural network parameter updated.

Article 13. The method of article 12, where, when the mask tensor is a one-dimensional tensor, the method generates the mask tensor by:

selecting n data elements with relatively large absolute values as valid data elements from every m data elements of a specified dimension of the neural network parameter, where m>n; and determining the mask tensor based on positions of n valid data elements in the m data elements.

Article 14. The method of article 12, where, when the mask tensor is a two-dimensional tensor, the method generates the mask tensor by:

presetting a specific number of two-dimensional mask tensors, where each dimension of the two-dimensional mask tensors includes m elements, of which n elements are 1, m-n elements are 0, and m>n;

masking two specified dimensions of the neural network parameter respectively based on each preset two-dimensional mask tensor to obtain a masked parameter tensor;

performing a product sum operation on training data of a neural network based on each masked parameter tensor to obtain a parameter evaluation value; and selecting a two-dimensional mask tensor that generates the largest of all parameter evaluation values as the mask tensor.

Article 15. The method of any one of articles 1 to 14, where the method is performed in multiple iterations in a mask adjustment phase of sparsification training.

Article 16. The method of article 15, where the mask adjustment phase further includes:

judging whether a percentage that all element values of the mask tensor are not changed reaches a threshold in multiple consecutive iterative training; and ending the mask adjustment phase if the percentage that all element values of the mask tensor are not changed reaches the threshold in the multiple consecutive iterative training.

Article 17. The method of article 16, where the threshold is one of 80%, 90%, and 100%.

Article 18. The method of any one of articles 1 to 10, where the method is performed in multiple iterations in a mask fixing phase of sparsification training, and the mask tensor is fixed as a mask tensor that is finally determined in a previous phase.

Article 19. The method of article 18, where updating the neural network parameter includes updating the sparsified neural network parameter.

Article 20. The method of article 19, where updating the neural network parameter further includes:

using the mask tensor to perform sparsification processing on the neuron gradient; and updating the sparsified neural network parameter based on the neuron gradient sparsified.

Article 21. The method of any one of articles 18 to 20, where, during the mask fixing phase, fixed mask tensors and the neural network parameter sparsified are stored.

Article 22. The method of any one of articles 18 to 20, where, during the mask fixing phase, fixed mask tensors and the unsparsified neural network parameter are stored.

Article 23. A computer readable storage medium, on which computer program codes for sparsification training of a neural network model are stored, where, when the computer program codes are run by a processing apparatus, the method of any one of articles 1 to 22 is performed.

Article 24. A data processing apparatus, including a control circuit, a storage circuit, and an operation circuit, where the control circuit is configured to control the storage circuit and the operation circuit to perform sparsification training on a neural network model;

the storage circuit is configured to store information, where the information at least includes a neural network parameter and a mask tensor; and the operation circuit is configured to perform following operations under the control of the control circuit:

performing sparsification processing at least on the neural network parameter based on the mask tensor to compute a value of a loss function in forward propagation;

computing a neuron gradient and a neural network parameter gradient based on the loss function in back propagation; and updating the neural network parameter based on the neural network parameter gradient.

Article 25. The apparatus of article 24, where the operation circuit is further configured to:

compute the neuron gradient and the neural network parameter gradient based on an unsparsified neural network parameter in the back propagation; and update the neural network parameter based on the neural network parameter gradient.

Article 26. The apparatus of article 25, where the operation circuit is further configured to:

perform anti-sparsification processing on a sparsified neural network parameter to obtain the unsparsified neural network parameter.

Article 27. The apparatus of article 24, where the operation circuit is further configured to:

compute the neuron gradient and the neural network parameter gradient based on the neural network parameter sparsified in the back propagation; and update the neural network parameter based on the neuron gradient.

Article 28. The apparatus of article 27, where the operation circuit is further configured to:

perform sparsification processing on the neural network parameter based on a reverse mask tensor to obtain the neural network parameter sparsified in the back propagation.

Article 29. The apparatus of any one of articles 24 to 26, where the mask tensor is a one-dimensional tensor.

Article 30. The apparatus of article 29, where the one-dimensional tensor performs sparsification processing on an input channel dimension of the neural network parameter.

Article 31. The apparatus of articles 24 to 28, where the mask tensor is a two-dimensional tensor.

Article 32. The apparatus of article 31, where the two-dimensional tensor performs sparsification processing on an input channel dimension of the neural network parameter and an output channel dimension of the neural network parameter.

Article 33. The apparatus of to article 28, where, when the mask tensor is a two-dimensional tensor, the reverse mask tensor is generated by performing a dimension conversion on the mask tensor by the operational circuit.

Article 34. The apparatus of article 24, where the operation circuit is further configured to:

update an unsparsified neural network parameter.

Article 35. The apparatus of article 34, where the operation circuit is further configured to:

generate the mask tensor based on the unsparsified neural network parameter updated.

Article 36. The apparatus of article 35, where, when the mask tensor is a one-dimensional tensor, the operation circuit is configured to generate the mask tensor by:

selecting n data elements with relatively large absolute values as valid data elements from every m data elements of a specified dimension of the neural network parameter, where m>n; and determining the mask tensor based on positions of n valid data elements in the m data elements.

Article 37. The apparatus of article 35, where, when the mask tensor is a two-dimensional tensor, the operation circuit is configured to generate the mask tensor by:

presetting a specific number of two-dimensional mask tensors, where each dimension of the two-dimensional mask tensors includes m elements, of which n elements are 1, m-n elements are 0, and m>n;

masking two specified dimensions of the neural network parameter respectively based on each preset two-dimensional mask tensor to obtain a masked parameter tensor;

performing a product sum operation on training data of a neural network based on each masked parameter tensor to obtain a parameter evaluation value; and selecting a two-dimensional mask tensor that generates the largest of all parameter evaluation values as the mask tensor.

Article 38. The apparatus of any one of articles 24 to 37, where the operation circuit is configured to perform operations in multiple iterations in a mask adjustment phase of sparsification training.

Article 39. The apparatus of article 38, where the operation circuit is further configured to: in the mask adjustment phase, judge whether a percentage that all element values of the mask tensor are not changed reaches a threshold in multiple consecutive iterative training; and end the mask adjustment phase if the percentage that all element values of the mask tensor are not changed reaches the threshold in the multiple consecutive iterative training.

Article 40. The apparatus of article 39, where the threshold is one of 80%, 90%, and 100%.

Article 41. The apparatus of any one of articles 24 to 33, where the operation circuit is configured to perform operations in multiple iterations in a mask fixing phase of sparsification training, and the mask tensor is fixed as a mask tensor that is finally determined in a previous phase.

Article 42. The apparatus of article 41, where the operation circuit is further configured to:

update the sparsified neural network parameter.

Article 43. The apparatus of article 42, where the operation circuit is further configured to:

use the mask tensor to perform sparsification processing on the neuron gradient; and update the sparsified neural network parameter based on the neuron gradient sparsified.

Article 44. The apparatus of any one of articles 41 to 43, where, during the mask fixing phase, the storage circuit is configured to store fixed mask tensors and the neural network parameter sparsified.

Article 45. The apparatus of any one of articles 41 to 43, where, during the mask fixing phase, the storage circuit is configured to store fixed mask tensors and the unsparsified neural network parameter.

Article 46. A chip, including the data processing apparatus of any one of articles 24 to 25.

Article 47. A board card, including the chip of article 46.

The embodiments of the present disclosure have been described in detail above. The present disclosure explains principles and implementations of the present disclosure with specific examples. Descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

The invention claimed is:

1. A method for sparsification training of a neural network model by a data processing apparatus, comprising:

performing sparsification processing on a neural network parameter based on a mask tensor to compute a value of a loss function in forward propagation;

computing a neuron gradient and a neural network parameter gradient based on the loss function in back propagation; and updating the neural network parameter based on the neural network parameter gradient.

2. The method of claim 1, further comprising:

computing the neuron gradient and the neural network parameter gradient based on an unsparsified neural network parameter in the back propagation; and updating the neural network parameter based on the neural network parameter gradient.

3. The method of claim 2, further comprising:

performing anti-sparsification processing on a sparsified neural network parameter to obtain the unsparsified neural network parameter.

4. The method of claim 1, further comprising:

computing the neuron gradient and the neural network parameter gradient based on the neural network parameter sparsified in the back propagation; and updating the neural network parameter based on the neuron gradient.

5. The method of claim 4, further comprising:

performing sparsification processing on the neural network parameter based on a reverse mask tensor to obtain the neural network parameter sparsified in the back propagation.

6. The method of claim 5, wherein the mask tensor is a two-dimensional tensor, wherein the two-dimensional tensor performs sparsification processing on an input channel dimension of the neural network parameter and an output channel dimension of the neural network parameter, and wherein the reverse mask tensor is generated by performing a dimension conversion on the mask tensor.

7. The method of claim 1, wherein the mask tensor is a one-dimensional tensor, and wherein the one-dimensional tensor performs sparsification processing on an input channel dimension of the neural network parameter.

8. The method of claim 1, wherein the updating the neural network parameter comprises updating an unsparsified neural network parameter;

wherein the method further comprises generating the mask tensor based on the updated unsparsified neural network parameter;

wherein when the mask tensor is a one-dimensional tensor, the method generates the mask tensor by:

selecting n data elements with relatively large absolute values as valid data elements from every m data elements of a specified dimension of the neural network parameter, wherein m>n; and determining the mask tensor based on positions of n valid data elements in the m data elements;

and wherein when the mask tensor is a two-dimensional tensor, the method generates the mask tensor by:

presetting a specific number of two-dimensional mask tensors, wherein each dimension of the two-dimensional mask tensors comprises m elements, of which n elements are 1, m-n elements are 0, and m>n;

masking two specified dimensions of the neural network parameter respectively based on each preset two-dimensional mask tensor to obtain a masked parameter tensor;

performing a product sum operation on training data of a neural network based on each masked parameter tensor to obtain a parameter evaluation value; and selecting a two-dimensional mask tensor that generates the largest of all parameter evaluation values as the mask tensor.

9. The method of claim 1, wherein the method is performed in multiple iterations in a mask adjustment phase of sparsification training; wherein the mask adjustment phase further comprises:

obtaining a percentage of element values of the mask tensor that are not changed in all element values of the mask tensor, and determining whether the percentage reaches a threshold in multiple consecutive iterative training; and ending the mask adjustment phase if the percentage that all element values of the mask tensor are not changed reaches the threshold in the multiple consecutive iterative training;

and wherein the threshold is one of 80%, 90%, and 100%.

10. The method of claim 1, wherein the method is performed in multiple iterations in a mask fixing phase of sparsification training, and the mask tensor is fixed as a mask tensor that is finally determined in a previous phase;

wherein updating the neural network parameter comprises:

using the mask tensor to perform sparsification processing on the neuron gradient; and updating the sparsified neural network parameter based on the sparsified neuron gradient;

and wherein during the mask fixing phase, fixed mask tensors and the sparsified neural network parameter are stored, or fixed mask tensors and unsparsified neural network parameter are stored.

11. A data processing apparatus, comprising a control circuit, a storage circuit, and an operation circuit, wherein the control circuit is configured to control the storage circuit and the operation circuit to perform sparsification training on a neural network model;

the storage circuit is configured to store information, wherein the information comprises a neural network parameter and a mask tensor; and the operation circuit is configured to perform following operations under the control of the control circuit:

performing sparsification processing on the neural network parameter based on the mask tensor to compute a value of a loss function in forward propagation;

computing a neuron gradient and a neural network parameter gradient based on the loss function in back propagation; and updating the neural network parameter based on the neural network parameter gradient.

12. The apparatus of claim 11, wherein the operation circuit is further configured to:

compute the neuron gradient and the neural network parameter gradient based on an unsparsified neural network parameter in the back propagation; and update the neural network parameter based on the neural network parameter gradient.

13. The apparatus of claim 12, wherein the operation circuit is further configured to:

perform anti-sparsification processing on a sparsified neural network parameter to obtain the unsparsified neural network parameter.

14. The apparatus of claim 11, wherein the operation circuit is further configured to:

compute the neuron gradient and the neural network parameter gradient based on the neural network parameter sparsified in the back propagation; and update the neural network parameter based on the neuron gradient.

15. The apparatus of claim 14, wherein the operation circuit is further configured to:

perform sparsification processing on the neural network parameter based on a reverse mask tensor to obtain the neural network parameter sparsified in the back propagation.

16. The apparatus of claim 15, wherein the mask tensor is a two-dimensional tensor, wherein the two-dimensional tensor performs sparsification processing on an input channel dimension of the neural network parameter and an output channel dimension of the neural network parameter, and wherein when the mask tensor is a two-dimensional tensor, the reverse mask tensor is generated by performing a dimension conversion on the mask tensor by the operational circuit.

17. The apparatus of claim 11, wherein the mask tensor is a one-dimensional tensor and wherein the one-dimensional tensor performs sparsification processing on an input channel dimension of the neural network parameter.

18. The apparatus of claim 11, wherein the operation circuit is further configured to:

update an unsparsified neural network parameter and generate the mask tensor based on the updated unsparsified neural network parameter;

wherein when the mask tensor is a one-dimensional tensor, the operation circuit is configured to generate the mask tensor by:

selecting n data elements with relatively large absolute values as valid data elements from every m data elements of a specified dimension of the neural network parameter, wherein m>n; and determining the mask tensor based on positions of n valid data elements in the m data elements;

and wherein when the mask tensor is a two-dimensional tensor, the operation circuit is configured to generate the mask tensor by:

presetting a specific number of two-dimensional mask tensors, wherein each dimension of the two-dimensional mask tensors comprises m elements, of which n elements are 1, m-n elements are 0, and m>n;

masking two specified dimensions of the neural network parameter respectively based on each preset two-dimensional mask tensor to obtain a masked parameter tensor;

performing a product sum operation on training data of a neural network based on each masked parameter tensor to obtain a parameter evaluation value; and selecting a two-dimensional mask tensor that generates the largest of all parameter evaluation values as the mask tensor.

19. The apparatus of claim 11, wherein the operation circuit is configured to perform operations in multiple iterations in a mask adjustment phase of sparsification training;

wherein the operation circuit is further configured to:

in the mask adjustment phase, obtaining a percentage of element values of the mask tensor are not changed in all element values of the mask tensor, and determining whether the percentage reaches a threshold in multiple consecutive iterative training; and end the mask adjustment phase if the percentage that all element values of the mask tensor are not changed reaches the threshold in the multiple consecutive iterative training;

and wherein the threshold is one of 80%, 90%, and 100%.

20. A chip, comprising the data processing apparatus of claim 11.

* * * * *